United States Patent
Kutsch et al.

(10) Patent No.: US 10,304,045 B2
(45) Date of Patent: May 28, 2019

(54) BIOMETRIC SOLUTION ENABLING HIGH THROUGHPUT FARE PAYMENTS AND SYSTEM ACCESS

(71) Applicant: MasterCard International Incorporated, Purchase, NY (US)

(72) Inventors: Michael V. Kutsch, Rye, NY (US); Salman H. Syed, Elmsford, NY (US); Mark Lulic, Mohegan Lake, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 712 days.

(21) Appl. No.: 14/619,741

(22) Filed: Feb. 11, 2015

(65) Prior Publication Data

US 2015/0227923 A1 Aug. 13, 2015

Related U.S. Application Data

(60) Provisional application No. 61/939,132, filed on Feb. 12, 2014.

(51) Int. Cl.
*G06Q 20/32* (2012.01)
*G06Q 20/36* (2012.01)
(Continued)

(52) U.S. Cl.
CPC ......... *G06Q 20/3224* (2013.01); *G06Q 10/02* (2013.01); *G06Q 20/3674* (2013.01);
(Continued)

(58) Field of Classification Search
None
See application file for complete search history.

(56) References Cited

U.S. PATENT DOCUMENTS 6,338,041 B1 * 1/2002 Kawamata ............ G06K 17/00
340/505
6,636,833 B1 10/2003 Flitcroft
(Continued)

FOREIGN PATENT DOCUMENTS

CN 103021036 A 4/2013
JP H09-116960 A 5/1997
(Continued)

OTHER PUBLICATIONS

Colombian Patent and Trademark Office (PTO), Colombian Patent Application No. NC2016/0001754 in the name of Mastercard International Incorporated, Examiner's Opinion dated Feb. 16, 2018, English Translation pp. 1-8.
(Continued)

*Primary Examiner* — John W Hayes
*Assistant Examiner* — Jason B Fenstermacher
(74) *Attorney, Agent, or Firm* — Otterstedt, Ellenbogen & Kammer, LLP

(57) ABSTRACT

A communications network places in data communication an access point controlling access to a controlled access area; a server; and a medium-long range wireless communications transceiver. The transceiver detects presence of a portable electronic device outside the access point. The server obtains an indication that a user of the portable electronic device has been authenticated to the portable electronic device and initiates a payment approval process which is completed before the user seeks to pass through the access point. Based at least in part on the authentication and success of the payment approval process, the server provides to the access point an electronic token indicating that the user, bearing the portable electronic device, is to be allowed to pass through the access point into the controlled access area.

21 Claims, 10 Drawing Sheets

(51) Int. Cl.
  *G06Q 20/40* (2012.01)
  *G07C 9/00* (2006.01)
  *G06Q 10/02* (2012.01)
  *G07C 9/02* (2006.01)
(52) U.S. Cl.
  CPC ..... *G06Q 20/401* (2013.01); *G06Q 20/40145* (2013.01); *G07C 9/00007* (2013.01); *G07C 9/00087* (2013.01); *G06Q 2240/00* (2013.01); *G07C 9/025* (2013.01)

(56) References Cited

U.S. PATENT DOCUMENTS

| | | | |
|---|---|---|---|
| 7,136,835 | B1 | 11/2006 | Flitcroft |
| 7,828,204 | B2 | 11/2010 | Fiebiger |
| 8,584,936 | B2 | 11/2013 | Fiebiger |
| 2002/0187779 | A1* | 12/2002 | Freeny, Jr. ............ G06Q 20/32 455/422.1 |
| 2004/0236674 | A1* | 11/2004 | Chen ..................... G06Q 40/02 705/38 |
| 2007/0266081 | A1* | 11/2007 | Murchison, III ....... G07F 17/12 709/203 |
| 2008/0033880 | A1 | 2/2008 | Fiebiger et al. |
| 2008/0156873 | A1* | 7/2008 | Wilhelm ................ G07B 15/00 235/384 |
| 2009/0152343 | A1* | 6/2009 | Carter ................. G06Q 10/0633 235/379 |
| 2012/0173423 | A1 | 7/2012 | Burdett et al. |
| 2013/0090991 | A1* | 4/2013 | Underwood ......... G07B 15/063 705/13 |
| 2013/0212025 | A1 | 8/2013 | Tanner et al. |
| 2013/0275307 | A1* | 10/2013 | Khan ..................... G06Q 20/40 705/64 |
| 2013/0325566 | A1* | 12/2013 | Silbernagl ............. G06Q 20/04 705/13 |
| 2014/0337221 | A1* | 11/2014 | Hoyos ................. H04L 63/0861 705/44 |
| 2015/0120558 | A1* | 4/2015 | Andrews ............ G07C 9/00571 705/44 |

FOREIGN PATENT DOCUMENTS

| | | | | |
|---|---|---|---|---|
| JP | H11-066362 | A | 3/1999 | |
| JP | 2012-078995 | A | 4/2012 | |
| WO | 2011111011 | A1 | 9/2011 | |
| WO | 2013064463 | A1 | 5/2013 | |
| WO | WO 2013064463 | A1 * | 5/2013 | ............ G07C 11/00 |

OTHER PUBLICATIONS

Apple Push Notification Service, downloaded from http://en.wikipedia.org/wiki/Apple_Push_Notification_Serviceon Apr. 23, 2013, pp. 1-2.
Bluetooth, downloaded from http://en.wikipedia.org/wiki/Bluetooth on Apr. 19, 2013, pp. 1-11.
Mahesh Balakrishnan et al, Where's that Phone?: Geolocating IP Addresses on 3G Networks. IMC'09, Nov. 4-6, 2009, pp. 1-7.
IDEX, downloaded from http://www.idex.no/ on Dec. 17, 2013, pp. 1-2.
NagraID Security, downloaded from http://www.nidsecurity.com/ on Dec. 17, 2013, pp. 1.
International mobile subscriber identity, downloaded from http://en.wikipedia.org/wiki/IMSI on Apr. 22, 2013, pp. 1-4.
International Mobile Station Equipment Identity,downloaded from http://en.wikipedia.org/wiki/International_Mobile_Station_Equipment_Identity on Apr. 22, 2013, pp. 1-3.
James Anderson, MasterCard Digital Enablement Service (MDES):Making Digital Payments Happen. Downloaded from http://newsroom.mastercard.com/2014/09/10/mastercard-digital-enablement-service-mdes-making-digital-payments-happen/ on Nov. 5, 2014, pp. 1-3.
Mobile Point of Sale. Downloaded from http://www.mastercard.com/corporate/mpos.html on Sep. 5, 2013, pp. 1-2.
Near field communication, downloaded from http://en.wikipedia.org/wiki/Near_field_communication on Apr. 19, 2013, pp. 1-11.
Be-In-Be-Out Payment Systems for Public Transport. Queen's Printer and Controller of HMSO—Jul. 2009, pp. 1-160.
Mobility management. Downloaded from http://en.wikipedia.org/wiki/Temporary_Mobile_Subscriber_Identity on Apr. 22, 2013, pp. 1-4.
Tokenization: Securing the Digital Payments Ecosystem. Downloaded from http://arm.mastercard.com/securitymatters/2014-issue/tokenization-securon on Nov. 5, 2014, pp. 1-6.
Universally unique identifier, downloaded from http://en.wikipedia.org/wiki/Universally_unique_identifier on Jan. 30, 2014, pp. 1-5.
Wi-Fi. Downloaded from http://en.wikipedia.org/wiki/Wi-fi on Apr. 19, 2013, pp. 1-7.
Authorized Office Blaine Copenheaver, US PTO as ISR, PCT Patent Application PCT/US2015/015546, International Search Report dated May 14, 2015, pp. 1-2.
Authorized Office Blaine Copenheaver, US PTO as ISR, PCT Patent Application PCT/US2015/015546, Written Opinion of the ISR, dated May 14, 2015, pp. 1-13.
New Zealand Intellectual Property Office, NZ Appl'n. No. 723127, First Examination Report, dated Nov. 3, 2016, pp. 1-2.
New Zealand Intellectual Property Office, NZ Appl'n. No. 723127, Further Examination Report, dated May 29, 2017, pp. 1-2.
Japan Patent Office, Notice of Reason for Refusal dated Nov. 28, 2017, English Translation pp. 1-3, Application 2016-551847.
Korean Intellectual Property Office, Korean Patent Application Number Patent Application No. 10-2016-7024741, Office Action dated Dec. 28, 2017, English Translation pp. 1-10.
IP Office of Singapore, Written Opinion for Singapore Patent Application 11201606589Y, authorized officer Lai Tan Lei Tanny (Dr), pp. 1-7, dated Jan. 26, 2017.
IP Office of Singapore, Second Written Opinion for Singapore Patent Application 11201606589Y, authorized officer Lai Tan Lei Tanny (Dr), pp. 1-5, dated Nov. 30, 2017.
Canadian IP Office, Office Actin dated Jun. 7, 2017, pp. 1-3, Application No. 2,939,377.
IP Australia, Examination report No. 1, Application No. 2015217165, dated Jan. 12, 2017, pp. 1-3.
Supplementary European Search Report, EP Application No. EP 15 74 8552, dated Jun. 22, 2017, pp. 1-7.
Feb. 16 2018, Colombian Patent and Trademark Office (PTO), official action in Colombian Patent application No. NC2016/0001754, José Luis Salazar López et al., pp. 1-21 (in Spanish), English translation not yet received.
Rospatent, Patent Application No. 2016135776 in Russia, English Summary of Russian Formal Office Action, pp. 1-2, English Translation dated May 24, 2017.
Mr. John Tan, IP Office of Singapore, Written Opinion dated Nov. 12, 2018, counterpart Singapore application 2018/4867538609P, pp. 1-4.
Russian Federal Service for Intellectual Property, Counterpart Russian Application 2016135776/08(056133), May 18, 2018 Office Action, 9 pages plus English Translation 7 pages.
Canadian IP Office, Office Action dated Jun. 8, 2018, 4 pages.

* cited by examiner

BIOMETRIC SOLUTION ENABLING HIGH THROUGHPUT FARE PAYMENTS AND SYSTEM ACCESS

CROSS-REFERENCE TO RELATED APPLICATIONS

This patent application claims the benefit of U.S. Provisional Patent Application Ser. No. 61/939,132 filed on Feb. 12, 2014 and entitled "BIOMETRIC SOLUTION ENABLING HIGH THROUGHPUT FARE PAYMENTS AND SYSTEM ACCESS." The complete disclosure of the aforementioned U.S. Provisional Patent Application Ser. No. 61/939,132 including all appendices thereof is expressly incorporated herein by reference in its entirety for all purposes.

FIELD OF THE DISCLOSURE

The present disclosure relates generally to the electronic and computer arts and, more particularly, to payment and/or access control using wireless devices and the like.

BACKGROUND OF THE DISCLOSURE

In comparison to Check-In Check-Out schemes (also called Tap-In Tap-Out or Touch-In Touch-Out) using proximity smart cards, where the user has to check in while boarding and to check out while alighting, Be-In Be-Out (BIBO) is the common name for ticketing technologies that detect and register automatically the presence of smart devices (smart phones and tablets are non-limiting examples) in a public transport vehicle. BIBO schemes do not require any user action and are therefore "hands free."

SUMMARY OF THE DISCLOSURE

Principles of the disclosure provide a biometric solution enabling high throughput fare payments and system access. Some alternative embodiments utilize one or more forms of authentication other than biometrics.

In one aspect, an exemplary method includes detecting presence of a portable electronic device outside an access point to a controlled access area; obtaining, from the portable electronic device, an indication that a user of the portable electronic device has been authenticated to the portable electronic device; and initiating a payment approval process associated with an account of the user. The payment approval process is completed before the user seeks to pass through the access point. Further steps include: based at least in part on obtaining the indication of the authentication and success of the payment approval process, providing to the access point an electronic token indicating that the user, bearing the portable electronic device, is to be allowed to pass through the access point into the controlled access area; allowing the user, bearing the portable electronic device, to pass through the access point into the controlled access area, based at least in part on the electronic token; and causing the electronic token to expire after the user passes through the access point into the controlled access area In another aspect, an exemplary system includes: an access point controlling access to a controlled access area; a server; a medium-long range wireless communications transceiver; and a communications network placing the access point, the server, and the transceiver in data communication. The transceiver is configured to detect presence of a portable electronic device outside the access point; the server is configured to obtain, from the portable electronic device, via the transceiver and the communications network, an indication that a user of the portable electronic device has been authenticated to the portable electronic device; and the server is configured to initiate a payment approval process associated with an account of the user. The payment approval process is completed before the user seeks to pass through the access point. The server is configured to, based at least in part on the indication of authentication and success of the payment approval process, provide to the access point an electronic token indicating that the user, bearing the portable electronic device, is to be allowed to pass through the access point into the controlled access area; and the access point is configured to allow the user, bearing the portable electronic device, to pass through the access point into the controlled access area, based at least in part on the electronic token.

Aspects of the disclosure contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the disclosure or elements thereof can be implemented in the form of a computer program product including a tangible computer readable recordable storage medium with computer usable program code for performing the method steps indicated stored thereon in a non-transitory manner. Furthermore, one or more embodiments of the disclosure or elements thereof can be implemented in the form of a system (or apparatus) including a memory and at least one processor that is coupled to the memory and operative to perform exemplary method steps. Yet further, in another aspect, one or more embodiments of the disclosure or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the disclosure can provide substantial beneficial technical effects, including:
- controlling access to a transit system or the like in a manner such that the transit operator is guaranteed payment without forming a time-consuming passenger queue at the transit access point
- allows transit agencies to leverage consumer owned devices and standard communications protocols and networks to manage access to secure transit environments
- permits reliably identifying what person(s) have entered the transit system and their point(s) of entry and/or exit, thereby providing enhanced security and allowing the agency to augment monitoring and emergency management systems without significant additional investment in current systems allows the transit agency to better manage adoption and use of newer consumer technologies by relying on widely deployed technology standards rather than proprietary systems, which will reduce cost and facilitate introduction of new services and solutions unlike current systems that manage access to secure transit areas, which require extremely fast processing and/or decisioning (300 to 500 milliseconds), which in turn often forces the agency to compromise authentication and authorization processes in favor of transaction speed required to accommodate these high throughput environments, one or more embodiments minimize such limitations by moving the initiation of this process away from the transit gate and out to the limits of the wide area network in the transit facility Initiating the process away from the gate allows the agency to provide a better patron experience by identifying whether there is an opportunity to provide early warning or guidance to the patron based on consumer preference or patterns (e.g., likelihood of taking a certain train that the agency knows is delayed) or knowledge of system conditions (e.g., crowded platform, broken escalator, malfunctioning gate, etc.)

Initiating the process away from the gate is also helpful when electronic wallets are used for payment since more time is available for deployment and use of the wallet Initiating the process away from the gate is further helpful when risk-assessment type processing (alerts and controls) is to be employed (e.g., MasterCard's "inControl" product), since more time is available for such risk-assessment type processing.

These and other features and advantages of the present disclosure will become apparent from the following detailed description of illustrative embodiments thereof, which is to be read in connection with the accompanying drawings.

DETAILED DESCRIPTION OF PREFERRED EMBODIMENTS

One or more embodiments of the disclosure are generally applicable to cellular telephones, Internet tablets, and other mobile electronic devices with "Wi-Fi" capability, and the like. As used herein, "Wi-Fi" is defined to include any "wireless local area network (WLAN) products that are based on the Institute of Electrical and Electronics Engineers' (IEEE) 802.11 standards," regardless of whether entitled to utilize the "Wi-Fi" trademark or the "Wi-Fi CERTIFIED" logo.

Payment Devices and Associated Payment Processing Networks

Figure 1:
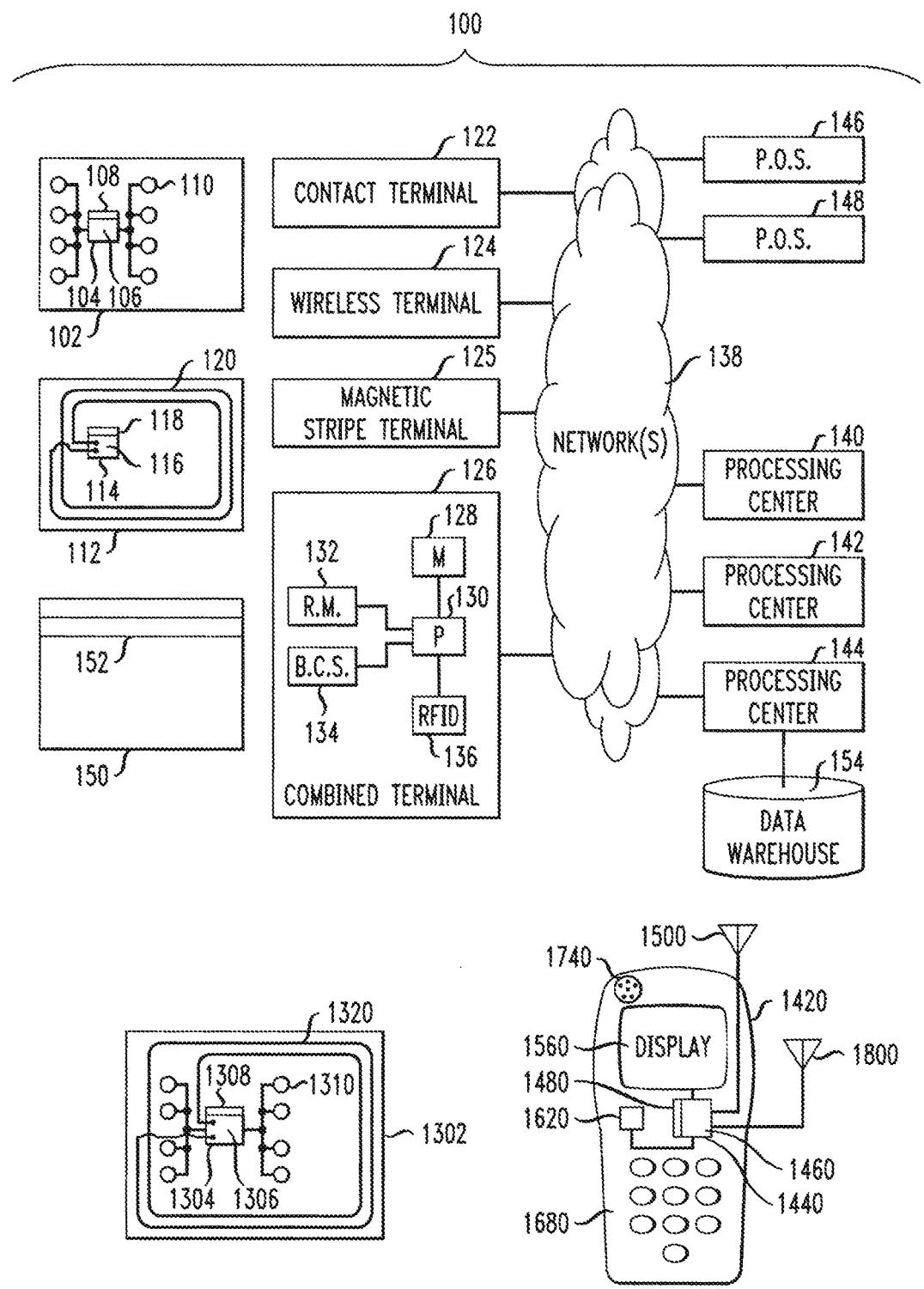
FIG. 1 shows an example of a system and various components thereof that can implement at least portions of at least some techniques of the disclosure.

Attention should now be given to FIG. 1, which depicts an exemplary embodiment of a system 100 and various components thereof that can implement at least portions of at least some techniques of the disclosure. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), tablet, and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate approach, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the MasterCard® PayPass™ specifications, available under license from MasterCard International Incorporated of Purchase, N.Y., USA (marks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement techniques of the disclosure. Such devices could include cards having a conventional form factor, smaller or larger cards, cards of different shape, key fobs, personal digital assistants (PDAs), appropriately configured cell phone handsets, tablets, or indeed any device with the capabilities to implement techniques of the disclosure. In some cases, the cards, or other payment devices, can include body portions (e.g., laminated plastic layers of a payment card, case or cabinet of a tablet, PDA or cellular phone, chip packaging, and the like), memories 108, 118 associated with the body portions, and processors 106, 116 associated with the body portions and coupled to the memories. The memories 108, 118 can contain appropriate applications. The processors 106, 116 can be operative to facilitate execution of one or more method steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone, tablet, or the like.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 1420. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. In an optional aspect, the aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

A dual-interface device 1302 is sometimes employed. Device 1302 is shown larger than devices 102, 112 for illustrative convenience but can have a similar form factor. Device 1302 includes an IC chip 1304 having a processor portion 1306 and a memory portion 1308. A plurality of electrical contacts 1310, similar to contacts 110, can be provided, as well as an antenna 1320 similar to antenna 120, together with an oscillator or oscillators, and/or additional appropriate circuitry for one or more of modulation, demodulation, downconversion, and the like, as described with regard to device 112. Appropriate firmware to manage the two available interfaces can be provided, with operation otherwise being similar to devices 102, 112.

An appropriately configured cellular telephone handset 1420 or similar device (e.g., tablet) can also be employed in a number of embodiments. Handset 1420 is depicted in semi-schematic form in FIG. 1, and can include one or more IC chips such as chip 1440 including a processing unit 1460 and a memory unit 1480. Wireless communication with a terminal can be provided via antenna 1500 or with a second antenna 1800 similar to above-described antenna 120 (i.e., the handset could have a second antenna for a payment application). Note that antenna 1800 is depicted schematically, but could be, e.g., a coil antenna as used in a typical "smart" card. Handsets 1420 can each be equipped with a suitable display 1560. Further, an appropriate power supply 1620 can also be provided. Such power supplies can include, for example, a battery and appropriate circuitry. The display and power supply can be interconnected with the processor portion. Different types of portable payment devices can combine or "mix and match" one or more features depicted on the exemplary devices in FIG. 1. Keypad 1680 and speaker 1740 can be provided. Many current devices omit keypad 1680 and employ a touchscreen instead. See discussion of FIG. 4 below.

The description of devices, elements, or components 102, 104, 106, 108, 110, 112, 114, 116, 118, 120 throughout this document are equally applicable to the corresponding items in the dual interface card 1302 and cellular telephone handset 1420.

For completeness, it should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts that do not have physical cards or other physical payment devices associated therewith; for example, a customer can be provided with a PAN, expiration date, and security code, but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
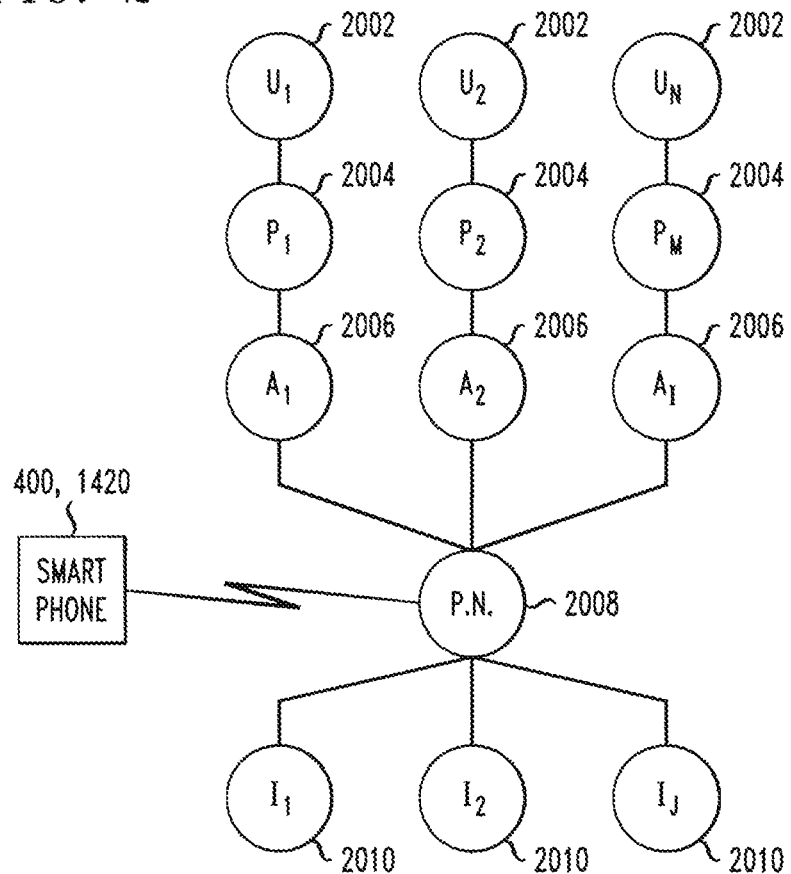
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the aforementioned BANKNET® network, or Visa International Service Association, operator of the aforementioned VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

ISO 8583:1993 (1993)

ISO 8583:1987 (1987)

It will be appreciated that the network 2008 shown in FIG. 2 is an example of a payment network configured to facilitate transactions between multiple issuers and multiple acquirers, which may be thought of as an "open" system. In other instances, a payment network configured to facilitate transactions between multiple issuers and a single acquirer could be used. Some embodiments of the disclosure may be employed with other kinds of payment networks, for example: proprietary or closed payments networks with only a single issuer and acquirer; private labels applications; white label capabilities; and the like. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer (and in at least some instances, the network operator, as well) are the same entity.

As used herein, a "payment card network" is a communications network that uses payment card account numbers, such as primary account numbers (PANs), to authorize, and to facilitate clearing and settlement of, payment card transactions—such as for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN) (which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. Nos. 6,636,833 and 7,136,835 of Flitcroft et al., the complete disclosures of both of which are expressly incorporated herein by reference in their entireties for all purposes. It is worth noting that in one or more embodiments, data associated with single use PANS is valuable whether or not the single use PANS can be re-mapped to the underlying account, cardholder, or household (even when they cannot be mapped they are still useful since they can be a proxy for a cardholder and still provide additional intelligence).

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. One or more embodiments are applicable to many other different kinds of payment card networks as well; the AMERICAN EXPRESS® network and the DISCOVER® network are non-limiting examples.

As seen in FIG. 2, in some instances, the owner or user of a smart phone 400, 1420 or similar device configured in accordance with one or more embodiments of the disclosure accesses a web site or the like (e.g., of the payment network operator 2008 or a transit system operator) to download a suitable application 421, discussed below, to the smart phone 400, 1420 or similar device. This feature is optional. Note that the connection between phone 1420 and payment network operator 2008 may very well be indirect; for example, payment network operator 2008 or a transit system operator may provide a "golden copy" of the application 421 to a third party (e.g., APPLE ITUNES STORE or Google's ANDROID MARKET) and phone 400, 1420 downloads over the web from such third party. The link shown between phone 400, 1420 and payment network operator 2008 may be direct or indirect; for example, via a cellular network and possibly with one or more intermediate parties.

Figure 7:
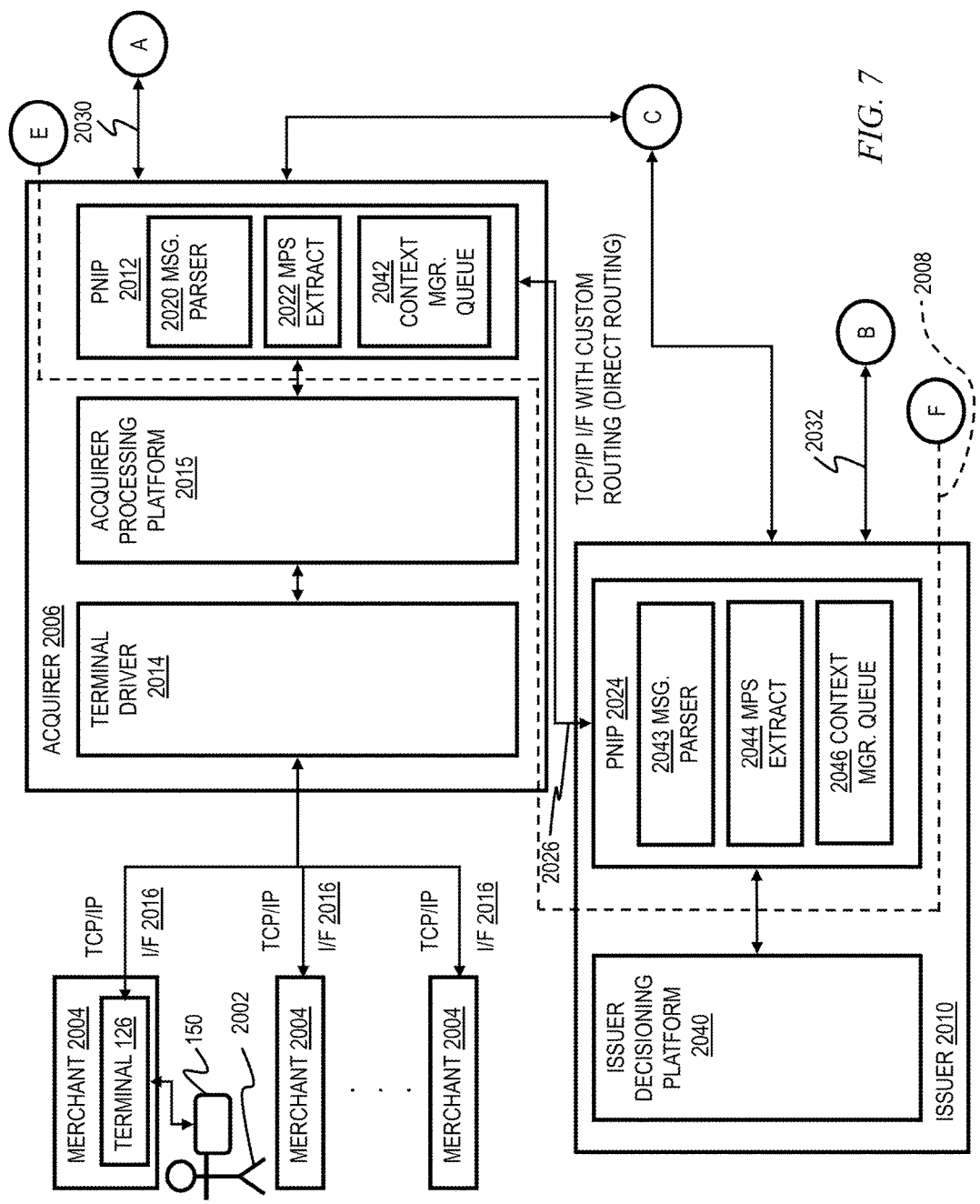
FIGS. 7 and 8 provide an exemplary detailed view of operation of a payment card network, in accordance with an aspect of the disclosure.
Figure 8:
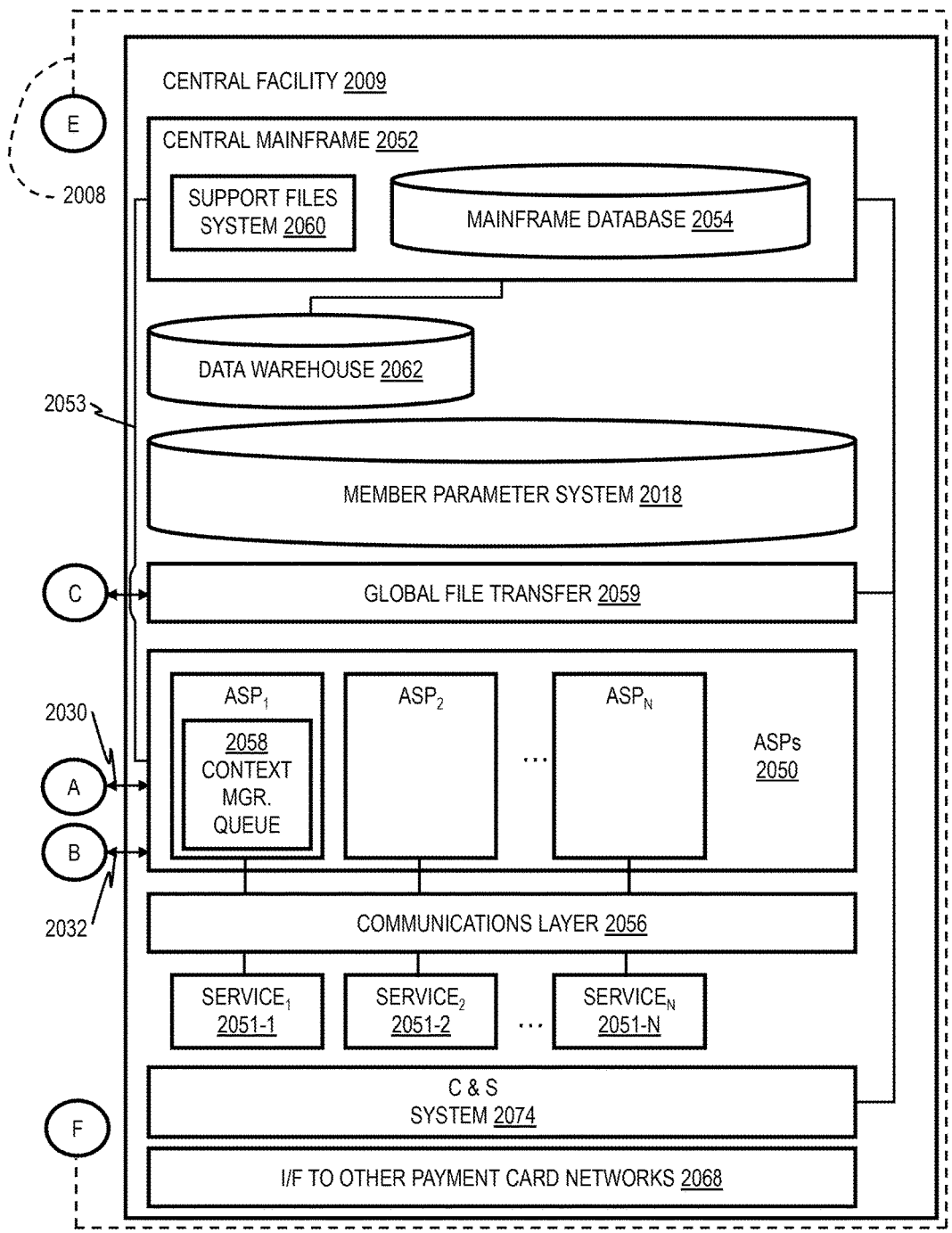

Still referring to FIG. 2, and with reference also now to FIGS. 7 and 8, by way of review and provision of additional detail, a consumer 2002 effectively presents his or her card 150 or other payment device (e.g., presents suitably configured "smart" phone or uses an e-wallet) to the terminal 126 of a merchant 2004. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 7 and 8 encompasses the network 2008. Note generally that points A, B, C, E, and F in FIG. 7 connect to the corresponding points in FIG. 8; the entire network and associated environment are not amenable to illustration on a single sheet.

More specifically, the acquirer 2006, in the more specific example of FIGS. 7 and 8, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format). The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 configuration and transactions from that account range are then routed to the port from which the sign-in request is received. A member ID can be present on ports on multiple PNIPs at an Issuer site—see discussion of FIG. 10 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages Routed Directly to the Issuer PNIP:

In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050, and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 9:
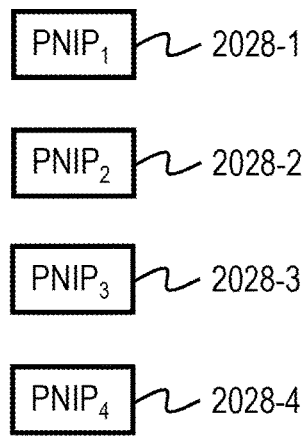
FIG. 9 shows a group of payment network interface processors, such as may be used with the network of FIGS. 7 and 8.
Figure 10:
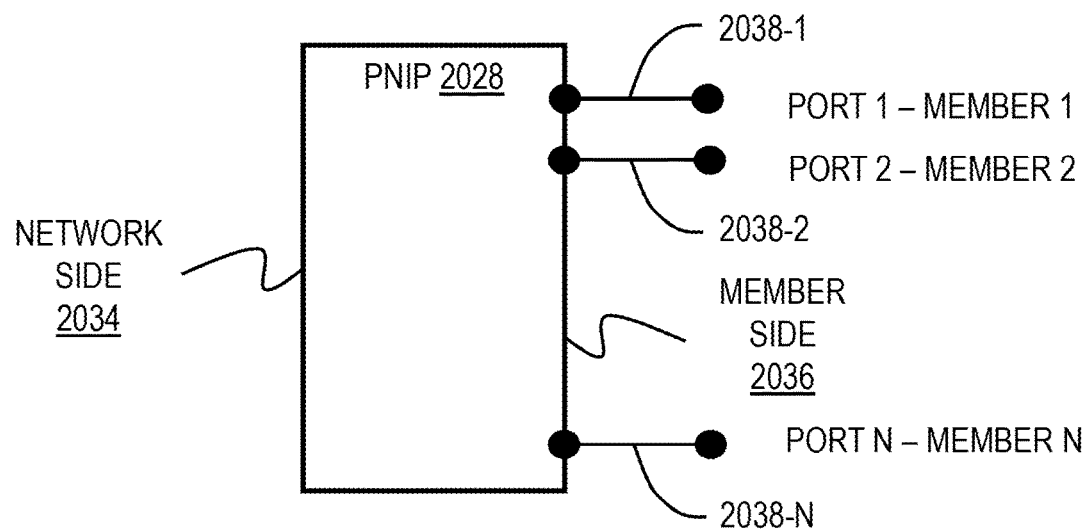
FIG. 10 shows a port arrangement on a payment network interface processor, such as may be used with the network of FIGS. 7 and 8.

FIG. 9 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 8 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 10 where a generalized PNIP 2028 has a network side 2034 and a member side 2036. Member side 2036 has N ports 2038-1 through 2038-N to members 1 to N. N is used herein as a generalized arbitrary integer and the value of N in FIG. 10 is not necessarily the same as that of N in connection with elements 2002 in FIG. 2, for example.

Figure 11:
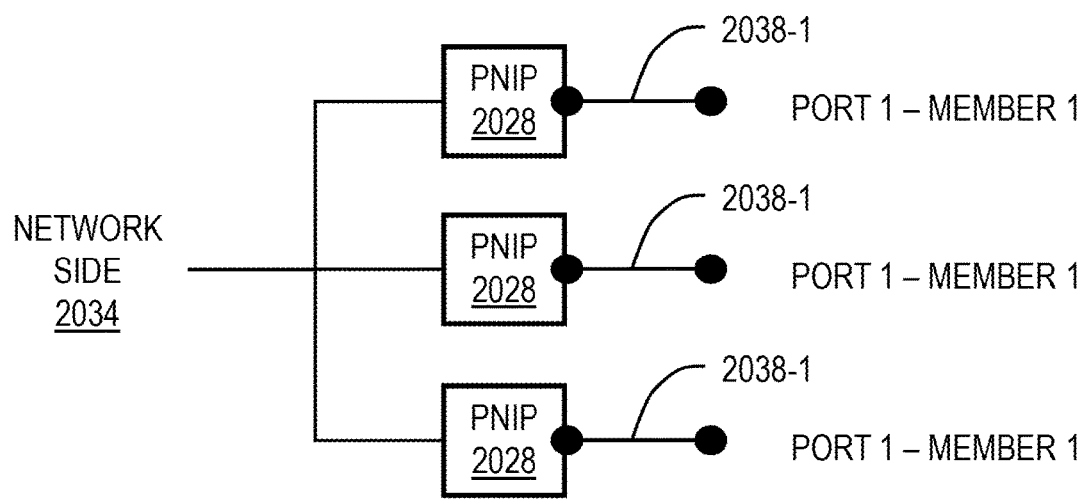
FIG. 11 shows a case wherein an issuer has multiple payment network interface processors.

As seen in FIG. 11, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 10). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 7 and 8 show "MPS extract" 2022, 2044; this will typically include the extract itself and the associated parameter file manager which manages obtaining the extracts from MPS 2018. Similarly, to reduce clutter, FIGS. 7 and 8 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 7 and 8 to avoid clutter.

Messages in Case of Enhanced Services:

In one or more instances, a special architecture is used to facilitate delivery of enhanced services (the ASP 2050 in FIGS. 7 and 8 is a non-limiting example). Examples of enhanced services include the MasterCard "inControl" product providing spending controls and/or virtual card numbers. Other examples are loyalty rewards, recurring payment cancellations, and the like. One or more instances do not deploy this complex logic out to the network edge. Furthermore in this regard, the issuer and acquirer PNIPs 2012, 2024 are referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse:

In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement:

One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic Aspects:

Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks.

Portable Computing Devices

Figure 4:
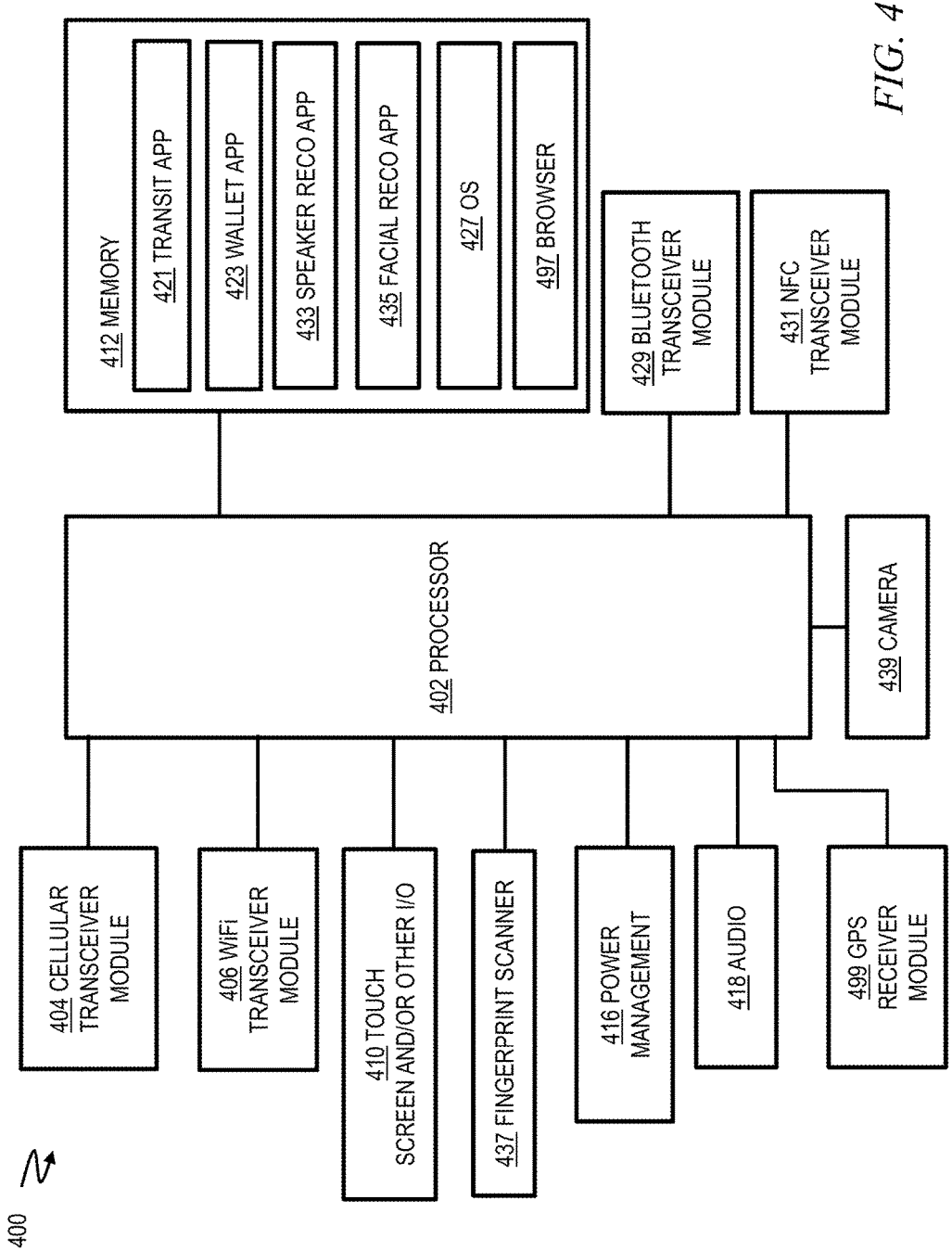
FIG. 4 is a block diagram of a "smart" phone or tablet computer configured in accordance with another aspect of the disclosure.

FIG. 4 is a block diagram of an exemplary tablet computing device, netbook, "Ultrabook" or other subnotebook, laptop, mobile electronic device, or smart phone 400 or the like; some embodiments can employ a display "smart" card with biometric capability (non-limiting examples include products available from IDEX ASA, Fornebu, Norway; products from NagraID SA—Kudelski Group, La Chaux-de-Fonds, Switzerland may also be useful in some instances). Unit 400 includes a suitable processor; e.g., a microprocessor 402. A cellular transceiver module 404 coupled to processor 402 includes an antenna and appropriate circuitry to send and receive cellular telephone signals, e.g., 3G or 4G. A Wi-Fi transceiver module 406 coupled to processor 402 includes an antenna and appropriate circuitry to allow unit 400 to connect to the Internet via a wireless network access point or hotspot. The skilled artisan will appreciate that "Wi-Fi" is a trademark of the Wi-Fi Alliance and the brand name for products using the IEEE 802.11 family of standards. A Bluetooth transceiver module 429 coupled to processor 402 includes an antenna and appropriate circuitry to allow unit 400 to connect to other devices via the Bluetooth wireless technology standard. An NFC transceiver module 431 coupled to processor 402 includes an antenna and appropriate circuitry to allow unit 400 to establish radio communication via near-field communications.

One or more embodiments include a transit application 421 in memory 412 which when executed causes the processor 402 to implement at least a portion of the functionality described herein. Operating system 427 orchestrates the operation of unit 400. Apple's iOS and Google's Android are non-limiting examples of suitable operating systems.

Touch screen 410 coupled to processor 402 is also generally indicative of a variety of input/output (I/O) devices such as a keypad, another type of display, a mouse or other pointing device, and so on, all of which may or may not be present in one or more embodiments. Audio module 418 coupled to processor 402 includes, for example, an audio coder/decoder (codec), speaker, headphone jack, microphone, and so on. Power management system 416 can include a battery charger, an interface to a battery, and so on. Memory 412 is coupled to processor 402. Memory 412 can include, for example, volatile memory such as RAM, and non-volatile memory such as ROM, flash, or any tangible computer-readable recordable storage medium which stores information in a non-transitory manner. Processor 402 will typically also have on-chip memory.

Fingerprint scanner 437 is coupled to processor 402 for biometric authentication purposes. An appropriate corresponding software application (not separately depicted) may reside in memory 412 in some instances. Many cell phones are equipped with a digital camera 439, shown coupled to processor 402. In some embodiments, camera 439 is used in conjunction with a facial recognition application 435 in memory 412 for biometric verification. In some embodiments, a microphone in audio module 418 is used in conjunction with a speaker recognition application 433 in memory 412 for biometric verification; a suitable acoustic front end can be provided. Some embodiments include a wallet application 423 as discussed elsewhere herein.

A GPS receiver module 499 coupled to processor 402 includes an antenna and appropriate circuitry to allow device 400 to calculate its position by precisely timing the signals sent by GPS satellites high above the Earth. Corresponding software optionally resides in memory 412.

Memory 412 can also include, for example, a stored PIN for comparison with a PIN entered via touch screen 410; extracted facial features from the legitimate owner of the phone for comparison with facial features extracted from a picture taken by camera 439; extracted fingerprint features from the legitimate owner of the phone for comparison with fingerprint features obtained from a scan carried out by scanner 437; and/or extracted voice features from the legitimate owner of the phone for comparison with voice features extracted from a voice sample obtained from a microphone in audio module 418. Note that elements in FIG. 4 are shown connected directly to processor 402; however, one or more bus structures can be employed in one or more embodiments. Furthermore, elements shown as implemented in software may be implemented at least in part in hardware for speed, if desired.

Browser program 497 in memory 412 deciphers html served out by a server such as 506 or 510 for display on screen 410 or the like.

Access Control Solution

One or more embodiments provide a solution that incorporates Wi-Fi, Bluetooth pairing of devices on entry to a transit (or other controlled access) environment, a device- or cloud-based wallet, and/or biometric authentication to create a low friction/high throughput experience for fare payment and/or access control. In one or more embodiments, the system recognizes a portable electronic device (e.g., cell phone, tablet) on entry to an area, examines device capabilities and/or user preferences, authenticates the user with biometrics solutions (fingerprint recognition, speaker recognition, facial recognition, and the like), and delivers an access and/or approval token to a control point (e.g., turnstile or other fare gate) before the patron enters the fare gate. The token is paired with the device upon the device entering within close range of the control point, and then the token is allowed to expire on exit from the access point or after a pre-determined period of time.

As used herein, "proximity" wireless communications refers to wireless communications with a maximum range of about ten to twenty centimeters, such as near field communication (NFC); "short range" wireless communications refers to wireless communications with a maximum range of about fifty to one hundred meters, such as BLUETOOTH; and "medium-long range" wireless communications refers to wireless communications technologies such as Wi-Fi and 3G, 4G, and LTE cellular networks.

Some embodiments use an alternative form of authentication, rather than biometrics; e.g., entry of a personal identification number (PIN). In some cases, depending on the device capability and/or the results of authentication and/or authorization, and/or the method of authentication (e.g. PIN versus biometric), the holder of the device may be sent to a different control point (e.g., to standard gate 524 instead of fast gate 522, or vice versa, as discussed below).

A variety of different use cases are possible with one or more embodiments of the disclosure. Some aspects are applicable in the case of a device 400 with biometric authentication capability (e.g., 437 with any needed software, 439 plus 435, 418 plus 433, and any corresponding hardware-implemented portions) and a wallet application 423, but without NFC capability 431. Some aspects are applicable in the case of a device 400 with biometric authentication capability, a wallet application, and with NFC capability 431. Some aspects are applicable in the case of a device 400 without biometric authentication capability, but with a wallet application, and with NFC capability 431. Some aspects are applicable in the case of a device 400 with biometric authentication capability, but with a cloud-based wallet in lieu of a wallet application, and without NFC capability 431.

Figure 5:
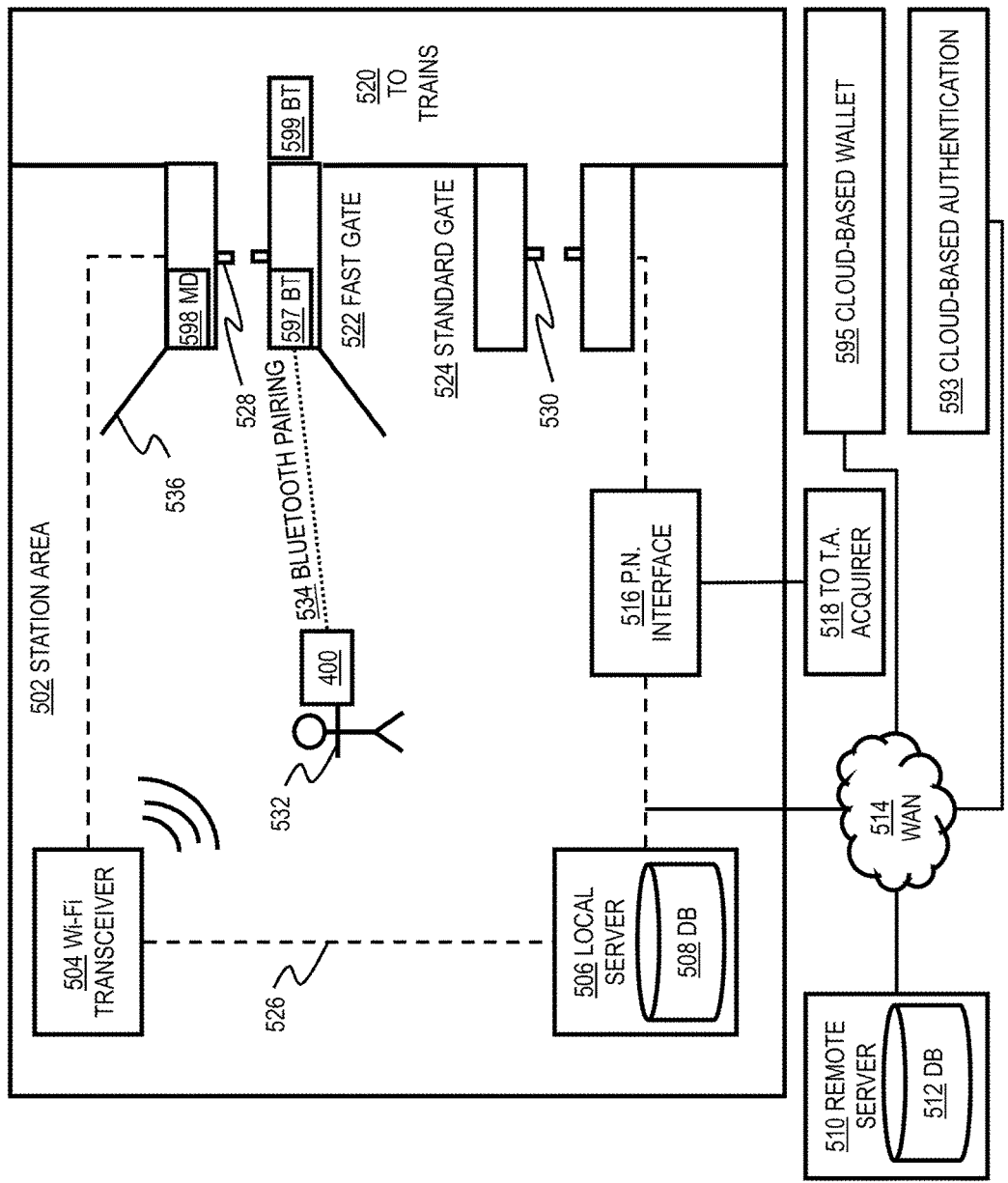
FIG. 5 is a diagram of a railroad station with a system in accordance with an aspect of the disclosure.

FIG. 5 shows an exemplary system in the context of a railroad station area 502, it being understood that one or more embodiments are applicable to control access to a variety of different locations, such as bus terminals, subway terminals, stadiums, festivals, pubs, night clubs, corporate or educational campus environments, theme parks, hotels, shopping malls, and holiday parks. The station area 502 includes at least one Wi-Fi transceiver 504, as well as a "fast" access gate 522 using aspects of one or more embodiments of the disclosure. Optional components include a local server 506 with database 508; a payment network interface 516; and a standard access gate 524. Gates 522, 524 are optionally equipped with barriers 528, 530 to prevent unauthorized access to trains reached via region 520. In lieu of barriers 528, 530 audio (e.g., buzzer) and/or visual (e.g., flashing light) techniques could be used to call attention to someone attempting to pass through without proper authentication and/or authorization.

In a non-limiting example, interface 516 can include an interface such as 2016, and related elements, as seen in FIG. 7 (e.g., TCP/IP connection between the LAN 526 and the acquirer with appropriate router and/or other hardware).

Elements 504, 506, 516, 522, 524 are placed in data communication via a suitable local area network (LAN) 526, which in general can be a Wi-Fi network for which transceiver 504 provides an access point; another wireless network; and/or a wired network such as a wired Ethernet. Optionally, a wide area network (WAN) connection 514 (e.g., Internet) is provided to a remote server 510 with database 512. Interface 516 may provide connectivity, for example, to an acquirer 518 of the transit agency or other entity operating the system in FIG. 5. See discussion of acquirers with regard to FIGS. 2 and 7-11.

In general, on entering a Wi-Fi zone in a facility (e.g., region in station 502 in range of transceiver 504), device 400 of user 532 is discovered, and the capabilities of device 400 and preferences of user 532 are discovered. In one or more embodiments, an application on the device 400 manages (on the device) these preferences or initiates a request to a host system 506, 510 which manages the database 508, 512 of customer preferences. In at least some instances, this database includes a customer profile maintained by the agency (as is currently done for registered patrons), with such additional information as is appropriate for one or more embodiments of the disclosure; for example, stored biometric signatures of patrons to facilitate customer verification and/or risk management preferences specifying a hierarchy of verification techniques. Alternatively, a "pay-as-you-go" transaction can be performed in some embodiments, allowing the patron to remain anonymous to the agency, but the patron is known by the issuer of the selected payment credential. User 532 is authenticated to device 400 via a biometric technique and/or by entering a PIN. An attempt is made to authorize payment. Note that some transit systems have a single flat fare (e.g., New York Subway System) while others have a distance-based fare (e.g., Washington, D.C. Metro System). In the latter case, in some instances, the authorization can be for a default amount. Including a communications capability similar to that shown in FIG. 5 at system exit points allows the agency to provide a similar low friction experience upon leaving the system. If authentication and authorization are successful, an approval token is sent (e.g., from local server 506) to gate 522. The user 532 walks to (open) gate 522 and is recognized as the device 400 pairs with the gate 522 on approach (e.g., via Bluetooth pairing as seen at 534). The token is confirmed and user continues through gate 522 (typically non-stop).

In some embodiments, such as theme parks, time-bound tokens are employed wherein the patron is charged based on the time spent in the park—the token expires upon exit and the cost for the day is calculated based on elapsed time, with pre-authorization capability.

Figure 12:
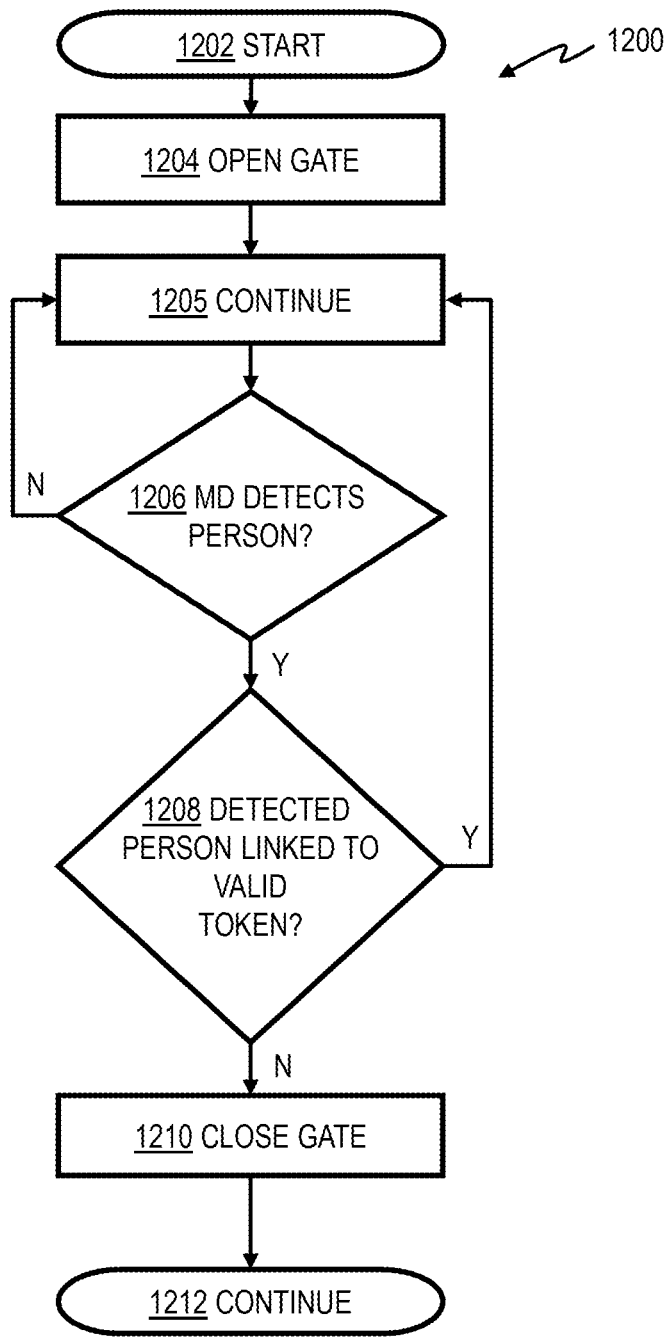
FIG. 12 shows control logic that can be implemented via a processor of an access gate, in accordance with an aspect of the disclosure.

Continuing now with regard to reference to an "open" gate, the gate is open if barriers 528 are retracted. In other cases, the barriers 528 are only opened when the device 400 specified by a given token approaches closely. For security reasons, the agency will typically desire a solution that maintains gates and/or other barriers of some type. In at least some instances, such gates or other barriers remain open until an unauthorized prospective patron is identified within a predetermined range (in a non-limiting example about 15 feet or 4.6 meters). For example, detect presence of an individual using a motion detector 598 or the like, and if that individual cannot be linked to a token, shut the gate. Referring to flow chart 1200 of FIG. 12, which begins at 1202, fast gate 522 may include a processor to control barriers 528. The processor, in some embodiments, implements the logic in FIG. 12. The barriers are initially maintained in an open position in step 1204. Processing continues at 1205. In decision block 1206, input from motion detector 598 or the like allows determining whether a person has been detected near gate 522. If not, as per the "N" branch, loop back to 1205 and continue checking. If so, as per the "Y" branch, logical control moves to decision block 1208, and it is determined whether the detected person is linked to a token. For example, is the person carrying a device with an identifier that matches an identifier in a valid token in gate 522? If yes, as per the "Y" branch, loop back and continue checking. If no, as per the "N" branch, close the barrier in step 1210 and investigate; continue in that state, as at step 1212, until the issue is resolved and it is again deemed appropriate to open the barrier.

Some embodiments have the gate or other barrier open as a default, and close the gate or other barrier when an unauthorized person is sensed in the vicinity; other embodiments have the gate or other barrier closed as a default, and open the gate or other barrier when an authorized person approaches, without any unauthorized person(s) in the vicinity.

Some users are re-directed to a standard gate line associated with standard gate 524 (e.g., authentication fails, or authenticated but authorization fails). Such users must present payment. Use of a device 400 for which authentication fails may be denied in at least some instances. Thus, if a user's selected or default payment account is denied (and the user is unable to select one that will be authorized), the user will be redirected to another gate location where he or she can present an alternate payment device.

Exemplary Use Cases

Non-limiting exemplary use cases will now be discussed.

Case A—Device with Biometric and Wallet (No NEC):

As noted, some aspects are applicable in the case of a device 400 with biometric authentication capability (e.g., 437 with any needed software, 439 plus 435, 418 plus 433, and any corresponding hardware-implemented portions) and a wallet application 423, but without NFC capability 431. Referring now to flow chart 600 of FIG. 6, which begins at 602, in step 604, enter a medium-long range wireless zone (e.g., Wi-Fi zone such as a region of station 502 in range of transceiver 504). The system (transceiver 504 coupled to server 506 via LAN 526 and/or to server 510 via LAN 526 and WAN 514) detects the presence of a phone 400 that is discoverable. In some instances, this detection is carried out by leveraging the same type of capabilities that devices employ to identify that they are in the range of a wireless network. Furthermore, in one or more embodiments, software on the local server 506 identifies not only that the device 400 is present but also whether the device has application 421 loaded thereon and/or is registered to the system (and if not, asks user 532 whether such registration is desired). In decision block 606, a determination is made as to whether user 532 has opted out of participation. If so, as per the Y branch of block 606, this pass through the logical flow ends at 622. If not, proceed to decision block 608 and determine whether the user 532 has opted in. These steps can be carried out via program logic on server 506 and/or server 510, for example. If not opted in or out, as per the N branch of block 608, prompt the user 532 to set his or her phone 400 to be discoverable in step 624. These steps can be carried out, for example, via program logic on server 506 and/or server 510, sending a message to phone 400 via transceiver 504, LAN 526, and, if server 510 is employed, via WAN 514. If opted in, as per the Y branch of block 608, or if the prompt 624 elicits a favorable response, as per step 610, wake up application 421; alert Blue Tooth or other protocol to device approaching gate (if Blue Tooth, pair devices or re-establish prior pairing). In some embodiments, a signal to the phone 400 wakes up the app 421, if it is present. In an alternative approach, discussed further elsewhere herein, user 532 accesses a local web page on device 400, instead of or in addition to using app 421. In some cases, the local web page takes the place of the app. In some cases, the local web page allows the user to download the app. The local web page may be served out to a browser of the phone 400 by, for example, server 506 or server 510.

In step 612, if biometric capability is present, authenticate user 532 with same (some alternate embodiments use a PIN instead of or together with biometric authentication) and then authorize payment in step 614. More particularly with regard to authentication, if authentication fails, as per the N branch of decision block 612, this pass through the logical flow ends at 622. These steps can be implemented via program logic on server 506 and/or server 510, for example; such logic may interface with an API or the like to obtain authentication results from 433, 435, or an application associated with 437. Further use of the device 400 may, in some instances, be forbidden within area 502. In some cases, this can be accomplished by using an identifier of device 400 in a "denial token" sent to gates 522 and/or 524. If authentication succeeds, as per the Y branch of decision block 612, proceed to authorization decision block 614. Further details regarding one non-limiting exemplary authentication process are described further below. Again, this portion of the logical flow can be implemented via program logic on server 506 and/or server 510, for example.

If authorization is not successful, as per the N branch of block 614, the user employs a standard entry procedure 626 (e.g., purchase a conventional fare card and enter via gate 524). Then, this pass through the logical flow ends at 622. The user may be prompted to use standard gate 524. These steps can be implemented, for example, via program logic on server 506 and/or server 510, sending appropriate messages to phone 400. Optionally, a "disapproval" token is sent to gate 528. In at least some cases, a message is sent to the phone, a denial token is sent to the gate, and the disapproval is logged in an application available to local service agents to alert them of potential issues. If authorization is successful, as per the Y branch of block 614, server 506 (or server 510) sends an approval token to fast gate 522, as per step 616. As the user exits gate 522 into area 520, departure is confirmed and the token is retired, as per decision block 618 (Y branch) and steps 620 (user allowed through gate 522) and 628. If the user does not pass through gate 522 within a pre-determined time of the token being generated, the token is retired in step 628 (and a message is logged to allow local service agents to be aware). Then, this pass through the logical flow ends at 622. Of course, the steps of FIG. 6 can be repeated many different times for many different users and devices. Once again, these portions of the logical flow can be implemented via program logic on server 506 and/or server 510, for example.

In some cases, users such as user 532 are channeled (e.g., via barriers 536) to ensure sequential flow and this is validated using multiple sensors before and after gate 522. See, for example, the discussion below of an embodiment with two Bluetooth transceivers. In some cases, an authenticated and authorized user such as user 532 approaches gate 522, where device 400 is paired with gate 522, as shown at 534, and device 400 is recognized at short range from gate 522. Again, some embodiments have the gate or other barrier open as a default, and close the gate or other barrier when an unauthorized person is sensed in the vicinity; other embodiments have the gate or other barrier closed as a default, and open the gate or other barrier when an authorized person approaches, without any unauthorized person(s) in the vicinity. When access to region 520 through gate 522 is appropriate for user 532, in some instances, a green light can be maintained or some other open flow indicator can be employed.

In some instances, if a user enters the vicinity (see discussion of motion detector 598 and FIG. 12) of the fast gate 522 but there is no unexpired approval token for that particular user (e.g., user failed authentication or authorization), barrier 528 is enabled and/or an attendant is alerted, or some other indication may be given, e.g., light turns red and/or alarm sounds. This can be carried out via instructions sent to fast gate 522 by server 506 and/or server 510, or by local processing capability on gate 522, or by some combination thereof.

Further details will now be provided regarding an exemplary authorization process. However, it is first worth noting that heretofore, attempts to use payment devices such as payment cards, appropriately configured cell phones, and the like for transit or similar applications have generally not been implemented with a real-time authorization request and authorization request response to and from the payment device issuer triggered by presentation of the device at the turnstile or other fare gate. This is because the time consumed in such authorization request and authorization request response to and from the payment device issuer has generally been considered intolerably long for transit or similar applications. See, for example, U.S. Pat. No. 7,828,204 and US Patent Publication No. 2008-0033880 (now U.S. Pat. No. 8,584,936). U.S. Pat. No. 7,828,204 and US Patent Publication No. 2008-0033880 (now U.S. Pat. No. 8,584,936) are hereby expressly incorporated by reference herein in their entireties for all purposes.

Advantageously, in one or more embodiments, because the phone 400 of user 532 is detected upon entry to area 502, if needed, there is time to carry out a real-time authorization request and authorization request response to and from the payment device issuer, via elements 516, 518, before the user 532 approaches the gate 522. In some cases, the authorization request is an ISO 8583 authorization request/0100 message and the authorization request response is an ISO 8583 authorization response/0110 message.

In one or more embodiments, authorization decision block 614 includes the following sub-steps:

Determine whether user 532 is a registered patron of the railroad or other authority. For example, a permanent identifier of phone 400 and/or application 421 and/or 423 may be stored in database 508 and/or database 512 in connection with other data regarding user 532. Logic on server 506 and/or server 510 obtains the identifier via transceiver 504, LAN 526 (and WAN 514 in the case of server 510) and makes an appropriate query to the corresponding database. Furthermore in this regard, if the devices 400 are cellular telephony devices (i.e., phones and/or tablets that can connect to a cellular network) then the International Mobile Station Equipment Identity (IMEI) is a non-limiting example of a suitable permanent identifier to uniquely identify a given device. Note that Wi-Fi only devices will typically not have an IMEI. As an alternative to the IMEI, or for devices that do not have an IMEI, a unique (or practically unique, i.e., highly unlikely to be duplicated) software ID such as a UUID (Universally Unique Identifier) can be used to identify application 421 and/or 423.

If the user 532 is registered, there may optionally be a stored preference regarding what mode of payment to use. For example, user 532 may have an account with the railroad or other authority maintained on server 506 and/or server 510. In some cases, this mode is used as a default; in other cases, the user is prompted to confirm that the default mode should be used. The user might confirm or might suggest another mode of payment to be used with device 400, or may indicate that it is desired to use conventional gate 524, in which case this is acknowledged and logical flow proceeds to 622.

If the stored preference is used by default or user confirmation, or if another mode compatible with process 600 was chosen by the user, a determination is made regarding the user's rights and/or products (pass, prefunded, and the like) and authorization is carried out. For example, database 508 and/or database 512 are checked to determine if the user has an unlimited pass or a prefunded account. If the former, if same is unexpired, the user is authorized. If the latter, a certain number of rides or a certain monetary value may be stored on server 506 and/or server 510. A check is made whether there is a ride still remaining or enough stored monetary value to permit the current ride; if so, the user is authorized. These types of processes generally do not require a real-time authorization request and authorization request response to and from the payment device issuer. However, it is conceivable that the user could have as a default, or could select as an alternative, a "pay as you go" approach wherein a payment card account associated with wallet 423 or a cloud-based wallet was to be employed. If so, a real-time authorization request and authorization request response to and from the corresponding issuer are carried out at this point; if successful, the user is authorized.

In the case of authorization, server 506 and/or server 510 generates an approval token and sends same to gate 522.

If authorization with one payment mode fails, optionally, seek a secondary registered source and re-authorize.

If all payment sources decline (or if the first source declines and the above step is not implemented), alert user 532 and send a decline token to gate 522; for example, using the device ID or ID resident in the device app 421 (if present). Prompt user 532 to proceed to gate 524 with an alternate payment device. In some instances, send a decline token to the device 400 to warn patron 532 of a problem, or use the decline token aspect for people who pose a security risk.

If the user 532 is not registered, prompt the user to select a payment mode from wallet 423 or a cloud-based wallet 595. Initiate a real-time authorization request and authorization request response to and from the corresponding issuer; if successful, the user is authorized. As used herein, a cloud-based wallet (e.g., Google Wallet mobile payment system of Google Inc., Mountain View, Calif., USA or MasterPass™ digital platform of MasterCard International Incorporated, Purchase, N.Y., USA) is one wherein payment card data is stored on secure cloud-based servers, instead of in a secure storage area on the phone or other mobile device. Cloud-based wallet 595 can be accessed in a variety of ways; for example, wide area network (WAN) connection 514 (e.g., Internet); a 3G or 4G or other cellular connection from device 400, or the like.

In some instances, in another aspect, as part of Case A, only accept registered users with a prepaid account on server 506 and/or server 510, and periodically replenish such prepaid account.

Case B—Device with Biometric, NFC and Wallet:

As noted, some aspects are applicable in the case of a device 400 with biometric authentication capability, a wallet application, and with NFC capability 431. In such instances, steps 602-614, 624, and 626 can proceed as above. If the account user 532 has registered is declined and user 532's app or wallet does not give user 532 access to an alternative, user 532 can, in some instances, initiate an MPOS-like transaction (MPOS=mobile point-of-sale) with a different payment device (e.g., a contactless card) while en route to the gate area (in some instances, via NFC capability)—this process allows the generation of an approval token and access to the fast gate 522. Otherwise, the agency can decide whether they want to take the risk of allowing the patron through the fast gate without certainty of payment. If the patron has successfully authenticated with a biometric, but does not have approved payment capability via the wallet or the patron's registered profile, the patron, in some instances, is directed to add prepaid value, thus leveraging the fast gate system or the other gates via NFC. NFC provides "tapped pair" capability. Thus, in some instances, a tapped pair phone provides an alternative embodiment where a physical reader is spaced away from the gate and a tapped pair is initiated using NFC. Stated in another way, when step 614 results in a decline, the user may, for example, (i) change his or her default payment device in his or her wallet, or may (ii) tap his or her wireless card (associated with a valid payment card account) on an NFC-enabled phone and thus initiate a new authorization process with the corresponding account. In approach (i), when entering the station, recognize a registered person, check that the default account is still valid, and advise the person when it is not. The system advises the person to update his or her default payment device in his or her wallet, and to inform the system when complete (could tell the person to text "yes" when done updating (or use e-mail, push notification, or other technique)). The system then re-attempts authorization with the new account information. Option (i) does not necessarily require NFC capability; for example, the user may log onto the wallet web site and update the expiration date or change the default card or add a new card and make that card the default. Option (ii) involves NFC or similar capability on the phone or other device so that the new card can be tapped.

Figure 6:
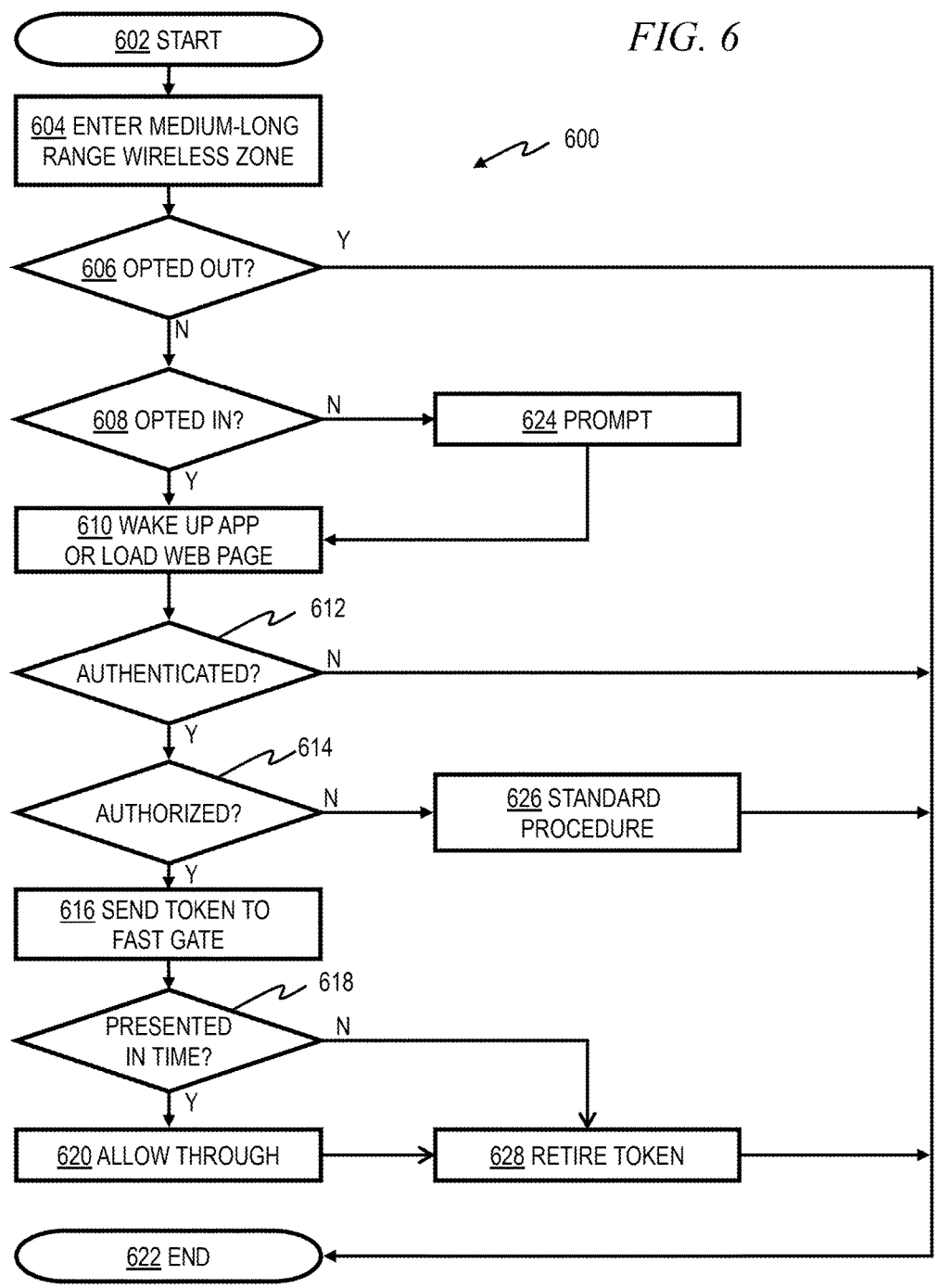
FIG. 6 is a flow chart of an exemplary method, in accordance with an aspect of the disclosure.

Case C—Device with NFC and Wallet (No Biometric):

As noted, some aspects are applicable in the case of a device 400 without biometric authentication capability, but with a wallet application, and with NFC capability 431. In such instances, processing can be carried out in the same manner as shown in FIG. 6 and described above, except that authentication step 612 can be carried out by entering a PIN or the like (or in another aspect, external, cloud-based biometric authentication 593 can be employed—cloud-based biometric authentication 593 can be accessed in a variety of ways; for example, wide area network (WAN) connection 514 (e.g., Internet); a 3G or 4G or other cellular connection from device 400, or the like). In some cases, cause the patron to tap at the regular lane 524, but use a token at standard gate 524 and have the benefit of full authorization. In this aspect, the agency may not want to send someone to the fast gate 522 without the assurance of the biometric. If someone is potentially doing something fraudulent, some level of control is desirable—in some instances, requiring a tap at the gate 524 signals to the user that there is a higher degree of scrutiny (thereby acting as a deterrent to someone with illicit intent).

Case D—Device with Biometric and Cloud-Based Wallet (No NEC):

In some cases, it is desirable to accommodate someone who has the device and the wallet for payment, but has no desire to be registered to the agency's system—thus, allow a pay-as-you-go transaction. As noted, some aspects are applicable in the case of a device 400 with biometric authentication capability, but with a cloud-based wallet in lieu of a wallet application, and without NFC capability 431. In such instances, processing can be carried out in the same manner as shown in FIG. 6 and described above, except that in determining available payment options, communication is with a cloud-based wallet 595 (e.g., over WAN 514) instead of wallet app 423. It is worth noting that for some patrons, the agency may want the flexibility to take some risk depending on the scenario (decline type, patron profile, etc.).

Access Control Solution—Additional Comments

Thus, one or more embodiments provide one or more biometrics approaches paired with delivery of approval tokens delivered via Wi-Fi or other suitable communications network(s) and recognized and acted on using Bluetooth or other protocol suitable for high speed mid-to-short range communications. In one or more embodiments, Wi-Fi is used to deliver tokens to devices 400 while LAN 526 is used to deliver tokens to fast gate 522 and/or standard gate 524. Furthermore, one or more embodiments enable highly secure low-friction throughput, leveraging a combination of communications protocols and authorization and/or authentication technologies.

Still further, one or more embodiments enable quick throughput in a transit or similar environment with a low-friction user experience. One or more embodiments employ a discoverable handheld device (e.g. smart phone) 400 with biometric capability. A user 532 with such a device enters a transit environment 502 or the like (embodiments of the disclosure, as noted, are not limited to transit applications; other non-limiting exemplary applications are discussed elsewhere herein). User 532 enters environment 502 and his or her phone 400 (or similar device) is discovered. In some embodiments, this causes an app 421 on the phone to wake up. User 532 authenticates himself or herself to the device using a biometric (or PIN). In a non-limiting example, this discovery and authentication process may occur while the user is approximately one hundred yards (approximately ninety-one meters) from the gate 522. Thus, the device 400 of user 532 has been recognized and user 532 has been authenticated to the device 400. In some instances, an inquiry is then made to determine whether user 532 is registered with some kind of transit product. For example, does user 532 have a monthly pass or a pre-funded account with sufficient stored value to allow user 532 access to the trains? If so, is the monthly pass or the pre-funded account valid? Note that this inquiry can be made, for example, to database 508 of local server 506 or to database 512 of remote server 510.

If the monthly pass or the pre-funded account is valid and it is known where user 532 is traveling to (e.g., based on the end points of the monthly pass in a commuter rail scenario where the passenger purchases a monthly pass between two fixed locations), a token is sent (for example, from server 506) to the fast gate 522. The token indicates to the fast gate 522 that the user 532 is approaching, that he or she has been authenticated, that his or her product is valid, and that, when he or she approaches, gate 522 should let him or her pass through. If, during authentication, it is determined that the user 532 has multiple transit pass products and it is not known which one he or she will use, there can be an interim step where an inquiry is made to the user 532 to determine which product to use.

As user 532 approaches the actual gate 522, Bluetooth communication or the like takes place between device 400 and gate 522. Typically, a Bluetooth pairing between the device 400 and gate 522 occurs as the user 532 approaches the gate 522, which, in effect, advises that gate 522 that device 400 is approaching. In some cases, as user 532 approaches the gate 522, gate 522 detects device 400 via Bluetooth from, say, about ten feet (about 3 meters) away. An entry token for user 532 has already been sent to gate 522 since user 532 has already been authenticated and authorized. In some cases, a green light located at gate 522 allows user 532 to walk right through unimpeded and board whatever train is desired, in region 520. If user 532 does not pass through gate 522 in a predetermined period of time, the token expires. Purely by way of example and not limitation, in some embodiments, expiration is a matter of hours. However, it is to be emphasized that expiration is typically variable based on the facility. For example, in New York's Grand Central Terminal, the process may occur before the patron leaves the area where there are dining and shopping venues. Alternatively, in some embodiments, the patron approaches the gate area and sees that he or she has missed the latest train before passing through the fast gate 522. The patron may then choose to leave the facility—if he or she leaves the Wi-Fi field and is recognized as having left, the token expires in such instances.

Some embodiments pair device 400 with two Bluetooth receivers 597, 599—one on each side of gate 522—to make sure that user 532 has crossed through. This serves to close out the transaction—verify that user 532 has taken the service he or she has just paid for. In this aspect, the receiver 599 is located such that the patron only comes into range after he or she passes through barrier 528 and enters train area 520. Some embodiments have multiple payment options: monthly pass, one-time transaction, or wallet 423 integrated with phone 400 (e.g., MASTERPASS digital wallet service available from MasterCard International Incorporated, Purchase, N.Y., USA; ISIS mobile wallet available from JVL Ventures, LLC, New York, N.Y., USA; or the Google Wallet available from Google Inc., Mountain View, Calif., USA). Regarding a one-time transaction, a user 532 may be walking into station 502 for the first time, not have a pass, and desire to ride the trains.

As noted, some embodiments use barriers 536 or the like to physically channel riders. For example, barriers 536 may be used in conjunction with appropriate signage or the like to ensure that people who are not authenticated and authorized to use fast gate 522 do not approach fast gate 522 but rather use conventional gate 524. Authenticated and authorized riders are directed appropriately so that there is adequate space to establish Bluetooth linkage.

Device 400 can be discovered upon entry to area 502 using a variety of techniques. Cellular telephones typically have a setting that allows the user to decide whether his or her phone is discoverable to networks; when selected the device transmits its location so that a Wi-Fi network knows it is present. GPS receiver module 499 could be used in some alternative embodiments.

In one or more embodiments, the aforementioned approval token is a digital pre-approval certificate indicating that user 532, by virtue of authentication and approval, in association with device 400, is cleared to pass through gate 522. In some embodiments, the token is encrypted. The token can identify the phone using, for example, the IMEI, as discussed above, or a unique (or practically unique, i.e., highly unlikely to be duplicated) software ID such as a UUID to identify application 421 and/or 423, as also discussed above. Other phone and/or software identifiers could be used in other instances, such as the International Mobile Subscriber Identity (IMSI), or the Temporary Mobile Subscriber Identity (TMSI), for example, subject to any applicable usage guidelines for same. Thus, in one or more embodiments the approval token states how a person was authenticated (e.g., for risk management and/or control purposes), what he or she is authenticated for, and ties the person 532 to the device 400.

In the transit use case, there is also the possibility of a person traveling with his or her family; i.e., a use case with more than one traveler. Some embodiments link one or more people to one or more phones all paid on the same account. That is to say, a single transit account in the back end may be linked to multiple devices (e.g., phones, tablets, etc.) tied to that account. The account could be funded by multiple payment devices. In some instances, if a user is travelling with others and paying for them, two exemplary options are available. In one option, if all travelers have a smart device, the smart devices of the other travelers are paired with the primary device (via Blue Tooth) and the additional smart devices are allowed to be additional "links" in a chain that includes the primary user. Note that this option potentially impacts security in one or more embodiments; e.g., if the agency were to choose to only allow biometrically authenticated patrons in the fast gate system. In another option, allow the additional travelers to prepay on the primary user's account with the system described herein. The primary user identifies, via the device app 421 that he or she is traveling with others. Then, the appropriate number of tokens are sent to the alternative (fast) gate(s) 522 and the appropriate number of sequential gate openings are allowed.

In some instances, the transit authority or other entity operating the railroad or other limited access area is wallet-enabled (e.g., a transit-authority specific wallet where one or more payment cards are registered with the transit authority, as opposed to a third party wallet such as Google Wallet). In one or more embodiments, user 532 walks into station 502 and connects to indicate his or her presence. In some embodiments, the user pre-enrolls with the transit authority; in other embodiments, no pre-enrollment is required; in still other embodiments, both cases are possible. In the case of a user who has not pre-enrolled, one or more embodiments are open to anyone with a discoverable smart phone that can communicate with the transit authority systems via Wi-Fi transceiver 504 and with fast gate 522 via Bluetooth or the like. Thus, at least some embodiments are suitable for "pay as you go" transit with no need to be registered with the transit authority or similar agency.

One or more embodiments employ a specific transit app 421 or a local web page visible on a browser of device 400 and served out, for example, from server 506. App 421 or the local web page queries user 532 whether he or she desires access to trains at 520 and if so, how he or she would like to pay (e.g., does he or she want to pay for a one-time fare or use his or her monthly pass). If the user has a monthly pass, payment may be effectuated by checking the pass on local server 506 or remote server 510; if same is unlimited, it is merely verified as being valid; if a certain amount of value is stored or a certain number of trips have been prepaid, the same can be decremented on server 506 or 510.

On the other hand, if the user does not have a pass or account already set up, or does so but nevertheless desires a one-time approach, check-out is tied to a wallet app 423 or a cloud-based wallet. For example, the wallet app 423 or cloud-based wallet supplies the user's card number and expiration date for a certain payment card in the wallet; local server 506 formats an authorization request to the transit authority's acquirer via interface 516, as seen at 518. Because this occurs shortly after user 532 enters station 502, there is time to carry out a full authorization request/authorization response to and from the issuer of the particular payment card account being used, unlike the case where the user's tapping of his or her card or other payment device on a conventional gate 524 is the first notice the system has of the user.

As noted, in one or more embodiments, the system communicates with device 400 via app 423 or by loading a local web page into a browser of device 400 (typically not via broadband wireless but via a Wi-Fi connection with transceiver 504). In some instances, user 532 can be prompted to download app 421 if not present. In some embodiments, the Wi-Fi connection with transceiver 504 results in the local page being the default page to load when the browser of phone 400 is invoked within the environment 502. Thus, in one or more embodiments, some affirmative act by user 532 is required—he or she must download app 421 as shown and described in connection with FIG. 2 and/or access the web via local Wi-Fi transceiver 504 and view the local page that "pops up" as a result.

In one or more embodiments, a user who has "opted in" and/or who has set his or her phone or other device to be discoverable to the Wi-Fi network can be prompted to engage in a session—he or she receives a message telling him or her to open his or her browser or activate his or her app 421. Any suitable messaging technique can be used; e.g., a push notification service, a text message, or the like.

Furthermore with regard to registration, opting out, opting in, and decision blocks 606, 608, in some instances it may not be desirable to have to query everybody who walks into a transportation facility such as 503 with a discoverable handset such as 400. Thus, in some instances, the system is only made available to those who have indicated that they want to use the system (e.g., by downloading the app 421). On the other hand, as per 606, 608, in some instances, users who have not explicitly opted out but who have also not affirmatively registered may be sent a message when first entering a region such as 502, after which they may decide to expressly opt in, expressly opt out, or remain unregistered but not opted out in which case they have the option for a "single use" ride via a real-time authorization request and authorization request response to and from the payment device issuer; such users will receive a similar message when they again enter an environment such as 502. In some cases, the agency has the opportunity to earn revenues by offering access to fast gate 522 as a premium service to those willing to pay a fee or higher tariff.

Thus, one or more embodiments enable low-friction throughput in a transit environment or other limited-access area, using the concepts of interacting with a consumer, pairing devices via Bluetooth or the like, and providing a token to a fast gate 522 so that as the user approaches, he or she can walk right through regardless of whether his or her phone is equipped with NFC.

Furthermore, one or more embodiments provide a transit pay-as-you-go solution; a transit pass solution; a transit fare-by-distance solution; and/or various non-transit access control solutions.

Initiating the process away from the gate is further helpful when risk-assessment type processing (alerts and controls) is to be employed (e.g., MasterCard inControl), since more time is available for such risk-assessment type processing. MasterCard inControl is a service that provides real-time email and mobile app alerts that keep a cardholder informed of where and how his or her cards are being used. Where inControl functionality or the like is in place, an authorization request response may be routed via ASPs 2050 as described above rather than directly back to the acquirer; the added time associated with initiating the process away from the gate may thus be particularly beneficial in such cases.

It is worth noting that in some embodiments, the auth step 614 in and of itself can be with an actual PAN or with a token generated by a wallet application on the person's device that is used to access his or her payment card account. The MasterCard Digital Enablement Service (MDES) system is an example of a system that uses a token in the form of an alternative PAN associated with the primary PAN. The MDES token should not be confused with the token in one or more embodiments, which is an access credential to be sent to the gate.

It is also worth noting that in some embodiments, fast gate 522 is configurable to function as a standard gate whenever a second conventional gate is preferred. Depending on the particular case, this could be during low volume periods, during high volume periods, or during times when regularly fewer regular users are expected (e.g., in a transit scenario, regular users are more likely than casual users to be set up to use the fast gate; on weekends, when more casual riders are expected, the fast gate could be configured to function as a regular gate).

Finally, it should again be reiterated that while a non-limiting example has been provided in the context of transit, other embodiments can be used in other scenarios; e.g., to control access to concerts or other venues as discussed elsewhere herein.

Recapitulation

Given the discussion thus far, it will be appreciated that, in general terms, an exemplary method (e.g., 600), according to an aspect of the invention, includes the step of detecting presence of a portable electronic device 400 outside an access point to a controlled access area 520 (refer to step 604). A further step 612 includes obtaining, from the portable electronic device, an indication that a user of the portable electronic device has been authenticated to the portable electronic device (some embodiments alternatively or additionally include the affirmative step of authenticating a user of the portable electronic device to the portable electronic device). A further step 614 includes initiating a payment approval process associated with an account of the user (step 614 may, but need not, be responsive to obtaining the indication of the authentication—steps 612 and 614 could be reversed in some instances). The payment approval process is completed before the user seeks to pass through the access point. A still further step 616 includes, based at least in part on obtaining the indication of the authentication and success of the payment approval process (Y branch of decision blocks 612 and 614), providing to the access point an electronic token indicating that the user, bearing the portable electronic device, is to be allowed to pass through the access point into the controlled access area. An even further step 620 includes allowing the user, bearing the portable electronic device, to pass through the access point into the controlled access area, based at least in part on the electronic token. Still another step 628 includes causing the electronic token to expire after the user passes through the access point into the controlled access area.

The step of detecting presence of the portable electronic device can be carried out, for example, by medium-long range wireless communications. For example, as noted above, the system (transceiver 504 coupled to server 506 via LAN 526 and/or to server 510 via LAN 526 and WAN 514) detects the presence of a phone or similar device 400 that is discoverable. In some instances, this detection is carried out by leveraging the same type of capabilities that devices employ to identify that they are in the range of a wireless network. In another approach, the step of detecting presence of the portable electronic device can be carried out, for example, by use of a global positioning system unit 499 on the portable electronic device.

The authenticating step can be carried out, for example, by biometrically authenticating the user of the portable electronic device to the portable electronic device (e.g., via fingerprint scan, speaker recognition, facial recognition, or the like). Alternatively, or in addition, the authenticating step can be carried out via entry of a personal identification number via I/O 410 for comparison with a number stored in memory 412. Server 506 or 510, e.g., obtains the indication of the success of authentication from app 421 on device 400 via transceiver 504 and network 526 (also network 514 in the case of server 510).

In some cases, the step of initiating the payment approval process can be carried out via server 506 using interface 516 to send an authorization request into a payment card network via acquirer 518. In some cases, the remote server could be configured to carry out this step. In other cases, server 506 or server 510 checks an account maintained by the user with the entity associated with the controlled access area (e.g., in database 508 or 512) for at least one of adequate funds, adequate number of remaining entrances, and non-expiration of a time-limited access pass.

The step of sending the approval token can be carried out, for example, by sending same from local server 506 to gate 522 over network 526.

As noted, in one or more embodiments, the aforementioned approval token is a digital pre-approval certificate indicating that user 532, by virtue of authentication and approval, in association with device 400, is cleared to pass through gate 522. In some embodiments, the token is encrypted. The token can identify the phone using, for example, the IMEI, as discussed above, or a unique (or practically unique, i.e., highly unlikely to be duplicated) software ID such as a UUID to identify application 421 and/or 423, as also discussed above. Other phone and/or software identifiers could be used in other instances, such as the International Mobile Subscriber Identity (IMSI), or the Temporary Mobile Subscriber Identity (TMSI), for example, subject to any applicable usage guidelines for same. Processing capability in fast gate 522 compares the identifier of the device 400 with the identifier in the token; if they match, a signal is generated to cause the gate to open (in the case of a normally closed default); the case of a normally open default was described in connection with FIG. 12.

The step of causing the electronic token to expire after the user passes through the access point into the controlled access area can include causing the electronic token to expire after a predetermined time. For example, the token can be time-stamped and logic in the fast gate 522 may cause expiration once actual clock time has passed the token time stamp by a predetermined amount. An expired token can be flagged with an "expired" flag or erased from memory in fast gate 522. The electronic token is typically caused to expire via logic at the access point.

It is worth noting that any of the logic described as residing on the fast gate could be on the server 506, 510 if the network connections are fast enough.

The step of causing the electronic token to expire after the user passes through the access point into the controlled access area can, in other instances, include sensing that the portable electronic device has passed through the access point into the controlled access area (e.g. with unit 599).

In some instances, the initiating of the payment approval process includes sending a real-time authorization request to an issuer of a payment device account associated with the portable electronic device. The payment approval process is completed before the user seeks to pass through the access point by receiving, from the issuer of the payment device account associated with the portable electronic device, in real time, a response to the real-time authorization request, before the user seeks to pass through the access point (again, via interface 518). As used herein, a payment device account is "associated with" a portable electronic device when the account information is stored on the device or in a cloud-based wallet accessible to a user of the device.

In some instances, the initiating of the payment approval process includes sending the real-time authorization request based on payment device account information contained in an electronic wallet application 423 on the portable electronic device; on the other hand, in some such instances, the initiating of the payment approval process includes sending the real-time authorization request based on payment device account information contained in a cloud-based wallet application 595 accessed by the portable electronic device.

In some cases, the user is registered with an entity associated with the controlled access area (e.g., railroad or transit system); and the initiating of the payment approval process includes checking an account maintained by the user with the entity associated with the controlled access area for at least one of adequate funds, adequate number of remaining entrances, and non-expiration of a time-limited access pass (e.g., on local server 506 or remote server 510). Such checking should be broadly construed to include checking for actual dollar amounts, a remaining number of rides or other counter, and so on.

In one non-limiting example, the controlled access area includes a rail transit system, the access point includes a fare gate 522, and the allowing includes allowing the user to pass into a region 520 wherein trains can be boarded.

In some instances, the access point comprises a fast access point 522 and the user includes a first user. Additional steps include repeating the detecting step and the step of obtaining the indication of authentication for a second user; responsive, at least in part, to success of the repeated obtaining of the indication of authentication, initiating a payment approval process associated with an account of the second user; and, responsive, at least in part, to failure of the payment approval process associated with the account of the second user, routing the second user away from the fast access point to a conventional access point 524. Refer to step 626.

In some such instances, a further step includes sending a disapproval token to the fast access point, responsive, at least in part, to the failure of the payment approval process associated with the account of the second user (N branch of block 614).

In some cases, the access point comprises a fast access point 522, the user includes a first user, and the controlled access area has a conventional access point 524 in addition to the fast access point. A further step includes responsive, at least in part, to failure of a second user to authenticate to a corresponding second portable electronic device, sending a disapproval token to the fast access point 522 and the conventional access point 524.

In some cases, the access point is configured to allow the user, bearing the portable electronic device, to pass through the access point into the controlled access area, based at least in part on the electronic token, by using short range (e.g. Bluetooth) wireless communications pairing between the access point and the portable electronic device.

In another aspect, an exemplary system includes an access point 522 controlling access to a controlled access area 520; a server 506; a medium-long range wireless communications transceiver 504; and a communications network 526 placing the access point, the server, and the transceiver in data communication. The transceiver is configured to detect presence of a portable electronic device 400 outside the access point. The portable electronic device can be viewed as a workpiece on which the system acts, or in other embodiments, can be part of the system per se. The server 506 is configured to obtain, from the portable electronic device, via the transceiver and the communications network, and indication that a user of the portable electronic device has been authenticated to the portable electronic device (e.g., transit app 421 interfaces with app providing biometric or PIN authentication) and communicates with server 506. The server is also configured to initiate a payment approval process associated with an account of the user (initiating payment approval may, but need not, be responsive to obtaining the indication of authentication, as discussed above). The payment approval process is completed before the user seeks to pass through the access point. The server is configured to, based at least in part on the indication of authentication and success of the payment approval process, provide to the access point an electronic token indicating that the user, bearing the portable electronic device, is to be allowed to pass through the access point into the controlled access area. The access point is configured to allow the user, bearing the portable electronic device, to pass through the access point into the controlled access area, based at least in part on the electronic token.

The server can be configured to initiate the payment approval process by sending a real-time authorization request to an issuer of a payment device account associated with the portable electronic device, via a payment network interface processor, or, where the user is registered with an entity associated with the controlled access area, by checking an account maintained by the user as described elsewhere herein.

System and Article of Manufacture Details

Embodiments of the disclosure can employ hardware and/or hardware and software aspects. Software includes but is not limited to firmware, resident software, microcode, etc. Software might be employed, for example, in connection with one or more of a smart phone, tablet, or other portable device 400, 1420, a terminal 122, 124, 125, 126, a reader 132, a gate 522, 524, payment devices such as cards 102, 112, 400, 1302, 1420, a host, server, and/or processing center 140, 142, 144 (optionally with data warehouse 154), 506, 510 of a merchant, issuer, acquirer, processor, transit system operator or operator of a similar limited access area (e.g., bus terminals, subway terminals, stadiums, festivals, pubs, night clubs, corporate or educational campus environments, theme parks, hotels, shopping malls, and holiday parks), operator of a network 2008 operating according to a payment system standard (and/or specification), and the like. Firmware might be employed, for example, in connection with payment devices such as cards 102, 112, 1302, 1420 and reader 132. Firmware provides a number of basic functions (e.g., display, print, accept keystrokes) that in themselves do not provide the final end-use application, but rather are building blocks; software links the building blocks together to deliver a usable solution.

Figure 3:
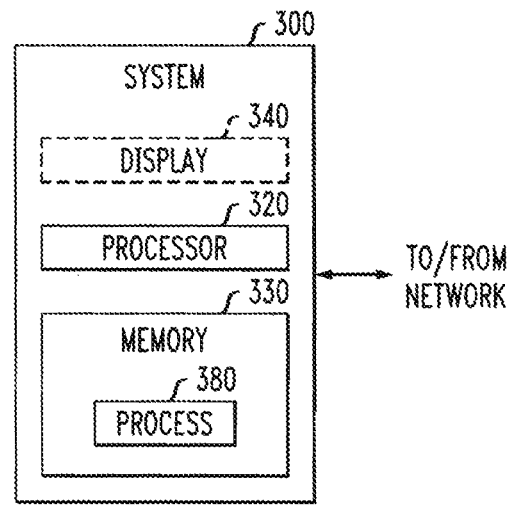
FIG. 3 is a block diagram of an exemplary computer system useful in one or more embodiments of the disclosure.

FIG. 3 is a block diagram of a system 300 that can implement part or all of one or more aspects or processes of the disclosure. As shown in FIG. 3, memory 330 configures the processor 320 (which could correspond, e.g., to processor portions 106, 116, 130; a processor of a reader 132; processors of remote hosts in centers 140, 142, 144; processors of hosts and/or servers 506, 510 implementing various functionality, a processor of a gate 522, a processor of a desktop computer, processor 402, and the like) to implement one or more aspects of the methods, steps, and functions disclosed herein (collectively, shown as process 380 in FIG. 3). Different method steps can be performed by different processors. The memory 330 could be distributed or local and the processor 320 could be distributed or singular. The memory 330 could be implemented as an electrical, magnetic or optical memory, or any combination of these or other types of storage devices (including memory portions as described above with respect to cards 102, 112). It should be noted that if distributed processors are employed, each distributed processor that makes up processor 320 generally contains its own addressable memory space. It should also be noted that some or all of computer system 300 can be incorporated into an application-specific or general-use integrated circuit. For example, one or more method steps could be implemented in hardware in an application specific integrated circuit (ASIC) or field programmable gate array (FPGA) rather than using firmware. Display 340 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined to exclude a transmission medium per se or disembodied signal per se.

The computer systems and servers described herein each contain a memory that will configure associated processors to implement the methods, steps, and functions disclosed herein. Such methods, steps, and functions can be carried out, by way of example and not limitation, by processing capability in processors 402, 320, or by any combination of the foregoing or other processors described herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the disclosure, such as, for example, 300, 400, 506, 510, 522 can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance. Unit 300 is representative of a server and also of a laptop, tablet, or desktop computer of a user.

Accordingly, it will be appreciated that one or more embodiments of the disclosure can include a computer program comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 300 as shown in FIG. 3) running a server program. It will be understood that such a physical server may or may not include a display, keyboard, or other input/output components. A "host" includes a physical data processing system (for example, system 300 as shown in FIG. 3) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the elements shown in the figures (e.g., various apps in memory 412, modules to implement described functionality on elements 506, 510, 522, 524, 593, 595, in FIGS. 7-11, and the like). The method steps can then be carried out using the distinct software modules of the system, as described above, executing on one or more hardware processors of the phone 400, server 506, server 510, gate 522, and so on. Further, a computer program product can include a tangible computer-readable recordable storage medium with code adapted to be executed to carry out one or more method steps described herein, including the provision of the system with the distinct software modules.

Computers, tablets, smart phones, gates, and/or other elements with processing capability as discussed herein can be interconnected, for example, by one or more of network 138, 2008, another virtual private network (VPN), the Internet, a local area and/or wide area network (LAN such as 526 and/or WAN such as 514), via an EDI layer, via a Wi-Fi network of which transceiver 504 is a part, via Bluetooth, via NFC, and so on. The computers can be programmed, for example, in compiled, interpreted, object-oriented, assembly, and/or machine languages, for example, one or more of C, C++, Java, Visual Basic, COBOL, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present disclosure have been described herein with reference to the accompanying drawings, it is to be understood that the disclosure is not limited to those precise embodiments, and that various other changes and modifications may be made by one skilled in the art without departing from the scope or spirit of the disclosure.

What is claimed is:

1. A method comprising:
   receiving, by a server separate and distinct from a portable electronic device and coupled to an access gate, notification that a transceiver detected presence of said portable electronic device once said portable electronic device is at a pre-determined distance from said access gate to a controlled access area;
   obtaining, by said server from said portable electronic device via said transceiver, an indication that a user of said portable electronic device has been authenticated to said portable electronic device;
   with said server separate and distinct from said portable electronic device and coupled to said access gate, initiating a real-time payment approval process associated with a payment device account of said user associated with said portable electronic device, by sending a real-time authorization request to an issuer of said payment device account, responsive at least in part to said notification of said detected presence of said portable electronic device;
   completing said real-time payment approval process by receiving, from said issuer of said payment device account associated with said portable electronic device, in real time, a response to said real-time authorization request, before said user approaches said access gate to enter said controlled access area;
   based at least in part on obtaining said indication of said authentication and success of said real-time payment approval process, sending from said server to said access gate an electronic token approving said user, bearing said portable electronic device, to pass through said access gate into said controlled access area, said electronic token comprising an access credential separate and distinct from said portable electronic device, said electronic token specifying said portable electronic device;
   providing an indication at said access gate that said user, bearing said portable electronic device, is allowed to pass through said access gate into said controlled access area, based at least in part on a first short range wireless receiver of said access gate, located on an entry side of said access gate, recognizing said portable electronic device specified in said electronic token, based on short range wireless communications pairing between said first short range wireless receiver of said access gate and said portable electronic device; and
   causing said electronic token to expire after a second short range wireless receiver of said access gate, located on an exit side of said access gate, verifies that said user has passed through said access gate into said controlled access area, based on short range wireless communications pairing between said second short range wireless receiver of said access gate and said portable electronic device, said second short range wireless receiver of said access gate being positioned such that said user only comes into range thereof after having passed into said controlled access area.

2. The method of claim 1, wherein said detecting comprises detecting via medium-long range wireless communications.

3. The method of claim 1, wherein said detecting comprises detecting via use of a global positioning system unit on said portable electronic device.

4. The method of claim 1, wherein said authenticating comprises biometrically authenticating said user of said portable electronic device to said portable electronic device.

5. The method of claim 1, wherein said authenticating comprises authenticating said user of said portable electronic device to said portable electronic device via entry of a personal identification number.

6. The method of claim 1, wherein said initiating of said payment approval process comprises sending said real-time authorization request based on payment device account information contained in an electronic wallet application on said portable electronic device.

7. The method of claim 1, wherein said initiating of said payment approval process comprises sending said real-time authorization request based on payment device account information contained in a cloud-based wallet application accessed by said portable electronic device.

8. The method of claim 1, wherein:
   said user is registered with an entity associated with said controlled access area; and
   said initiating of said payment approval process comprises checking an account maintained by said user with said entity associated with said controlled access area for at least one of adequate funds, adequate number of remaining entrances, and non-expiration of a time-limited access pass.

9. The method of claim 1, further comprising causing said electronic token to expire unless said user passes through said access gate into said controlled access area within a predetermined time.

10. The method of claim 1, wherein said controlled access area comprises a rail transit system, said access gate comprises a fare gate, and said allowing comprises allowing said user to pass into a region wherein trains can be boarded.

11. The method of claim 1, wherein said access gate comprises a fast access gate and said user comprises a first user, further comprising:
   repeating said detecting step and said step of obtaining said indication of authentication for a second user;
   responsive, at least in part, to success of said repeated obtaining of said indication of authentication, initiating a payment approval process associated with an account of said second user; and responsive, at least in part, to failure of said payment approval process associated with said account of said second user, routing said second user away from said fast access gate to a conventional access gate.

12. The method of claim 11, further comprising sending a disapproval token to said fast access gate, responsive, at least in part, to said failure of said payment approval process associated with said account of said second user.

13. The method of claim 1, wherein said access gate comprises a fast access gate, said user comprises a first user, and said controlled access area has a conventional access gate in addition to said fast access gate, further comprising:
responsive, at least in part, to failure of a second user to authenticate to a corresponding second portable electronic device, sending a disapproval token to said fast access gate and said conventional access gate.

14. The method of claim 2, wherein:
said portable electronic device is detected via said medium-long range wireless communications with a medium-long range wireless communications transceiver;
said indication of authentication is obtained from said portable electronic device at said server, via said transceiver and a communications network;
said electronic token is provided to said access gate from said server via said communications network; and
said electronic token is caused to expire via logic at said access gate in communication with said first and second short range wireless receivers.

15. The method of claim 1, wherein said causing said electronic token to expire after said user passes through said access gate into said controlled access area comprises causing said electronic token to expire when said user exits said controlled access area through another access gate.

16. The method of claim 1, further comprising causing said electronic token to expire when said user exits the region between the pre-determined distance and said access gate without passing through said access gate into said controlled access area.

17. The method of claim 1, wherein said detecting comprises detecting via use of a motion detector on said access gate.

18. The method of claim 1, further comprising:
closing a barrier at said access gate responsive to detecting presence of said portable electronic device; and
opening said barrier at said access gate responsive to said electronic token.

19. The method of claim 1, wherein said detecting comprises detecting other than via short range wireless communications.

20. A system comprising:
an access gate controlling access to a controlled access area;
a server;
a medium-long range wireless communications transceiver;
a communications network placing said access gate, said server, and said transceiver in data communication;
wherein:
said transceiver is configured to detect presence of a portable electronic device once said portable electronic device is a pre-determined distance from said access gate and to provide notification to said server of said detected presence of said portable electronic device;
said server is separate and distinct from said portable electronic device and is configured to obtain, from said portable electronic device, via said transceiver and said communications network, an indication that a user of said portable electronic device has been authenticated to said portable electronic device;
said server is configured to initiate a real-time payment approval process associated with a payment device account of said user, by sending a real-time authorization request to an issuer of said payment device account, responsive at least in part to said notification of said detected presence of said portable electronic device;
said server is configured to complete said real-time payment approval process by receiving, from said issuer of said payment device account associated with said portable electronic device, in real time, a response to said real-time authorization request, before said user approaches said access gate to enter said controlled access area;
said server is configured to, based at least in part on said indication of authentication and success of said real-time payment approval process, send to said access gate an electronic token approving said user, bearing said portable electronic device, to pass through said access gate into said controlled access area, said electronic token comprising an access credential separate and distinct from said portable electronic device, said electronic token specifying said portable electronic device;
said access gate is configured to provide an indication that said user, bearing said portable electronic device, is allowed to pass through said access gate into said controlled access area, based at least in part on a first short range wireless receiver of said access gate, located on an entry side of said access gate, recognizing said portable electronic device specified in said electronic token, based on short range wireless communications pairing between said first short range wireless receiver of said access gate and said portable electronic device; and
said access gate is configured to cause said electronic token to expire after a second short range wireless receiver of said access gate, located on an exit side of said access gate, verifies that said user has passed through said access gate into said controlled access area, based on short range wireless communications pairing between said second short range wireless receiver of said access gate and said portable electronic device, said second short range wireless receiver of said access gate being positioned such that said user only comes into range thereof after having passed into said controlled access area.

21. A non-transitory computer readable medium comprising computer executable instructions which when executed by a computer cause the computer to perform the method of:
receiving, by a server separate and distinct from a portable electronic device and coupled to an access gate, notification that a transceiver detected presence of said portable electronic device once said portable electronic device is at a pre-determined distance from said access gate to a controlled access area;
obtaining, by said server from said portable electronic device via said transceiver, an indication that a user of said portable electronic device has been authenticated to said portable electronic device;
with said server separate and distinct from said portable electronic device and coupled to said access gate, initiating a real-time payment approval process associated with a payment device account of said user associated with said portable electronic device, by sending a real-time authorization request to an issuer of said payment device account, responsive at least in part to said notification of said detected presence of said portable electronic device;

completing said real-time payment approval process by receiving, from said issuer of said payment device account associated with said portable electronic device, in real time, a response to said real-time authorization request, before said user approaches said access gate to enter said controlled access area;

based at least in part on obtaining said indication of said authentication and success of said real-time payment approval process, sending from said server to said access gate an electronic token approving said user, bearing said portable electronic device, to pass through said access gate into said controlled access area, said electronic token comprising an access credential separate and distinct from said portable electronic device, said electronic token specifying said portable electronic device;

providing an indication at said access gate that said user, bearing said portable electronic device, is allowed to pass through said access gate into said controlled access area, based at least in part on a first short range wireless receiver of said access gate, located on an entry side of said access gate, recognizing said portable electronic device specified in said electronic token, based on short range wireless communications pairing between said first short range wireless receiver of said access gate and said portable electronic device; and causing said electronic token to expire after a second short range wireless receiver of said access gate, located on an exit side of said access gate, verifies that said user has passed through said access gate into said controlled access area, based on short range wireless communications pairing between said second short range wireless receiver of said access gate and said portable electronic device, said second short range wireless receiver of said access gate being positioned such that said user only comes into range thereof after having passed into said controlled access area.

* * * * *